US012631923B2

(12) United States Patent
Ikeno

(10) Patent No.: US 12,631,923 B2
(45) Date of Patent: May 19, 2026

(54) LIQUID CRYSTAL DISPLAY DEVICE

(71) Applicant: Shanghai Tianma Micro-Electronics Co., Ltd., Shanghai (CN)

(72) Inventor: Hidenori Ikeno, Kawasaki (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 18/910,061

(22) Filed: Oct. 9, 2024

(65) Prior Publication Data

US 2025/0130467 A1    Apr. 24, 2025

(30) Foreign Application Priority Data

Oct. 19, 2023    (JP) ................................. 2023-179973

(51) Int. Cl.
*G02F 1/1362*        (2006.01)
*G02F 1/1368*        (2006.01)

(52) U.S. Cl.
CPC ...... *G02F 1/136209* (2013.01); *G02F 1/1368* (2013.01)

(58) Field of Classification Search
CPC .......................... G02F 1/136209; G02F 1/1368
See application file for complete search history.

(56) References Cited

U.S. PATENT DOCUMENTS

2016/0321975 A1*  11/2016  Yan ...................... G09G 3/2003
2018/0164622 A1*  6/2018  Ono .................. G02F 1/136286
2022/0404662 A1  12/2022  Shimoshikiryoh
2023/0251536 A1  8/2023  Ikeno et al.

FOREIGN PATENT DOCUMENTS

CN        116125714 A      5/2023
JP        H05-210110 A     8/1993
JP        2023-000275 A    1/2023

* cited by examiner

*Primary Examiner* — Lucy P Chien
(74) *Attorney, Agent, or Firm* — Sughrue Mion, PLLC

(57)        ABSTRACT

A liquid crystal display device includes a first liquid crystal display panel and a second liquid crystal display panel. The second liquid crystal display panel includes a switching element having light blocking properties, a first light blocking pattern extending in a first direction and having light blocking properties, a second light blocking pattern extending in a second direction and having light blocking properties, and a plurality of light shields having light blocking properties. The first light blocking pattern includes a first light blocking line and a second light blocking line. The light shield is located between a crossline and a symmetry axis within a region in which a spacing between the first light blocking line and the second light blocking line is continuously widen from both ends of the region in the first direction.

11 Claims, 21 Drawing Sheets

LIQUID CRYSTAL DISPLAY DEVICE

CROSS-REFERENCE TO RELATED APPLICATIONS

This application claims the benefit of Japanese Patent Application No. 2023-179973, filed on Oct. 19, 2023, the entire disclosure of which is incorporated by reference herein.

FIELD OF THE INVENTION

The present disclosure relates generally to a liquid crystal display device.

BACKGROUND OF THE INVENTION

In this related art, liquid crystal display devices having a plurality of liquid crystal display panels stacked on one another are known. For example, Unexamined Japanese Patent Application Publication No. 2023-000275 discloses a display device with a color display element (a color liquid crystal element) and a liquid crystal display panel stacked with the color display element.

In Unexamined Japanese Patent Application Publication No. 2023-000275, a TFT substrate of the liquid crystal display panel has a plurality of first bus lines extending in a first direction and a plurality of second bus lines extending in a second direction that intersects the first direction. At least one of the plurality of first bus lines and at least one of the plurality of second bus lines each overlap with subpixels of all colors included in the color liquid crystal element.

In Unexamined Japanese Patent Application Publication No. 2023-000275, the first bus line is extended while bending toward the first direction, and the second bus line is extended while bending toward the second direction, so that the first bus line and the second bus line overlap with the subpixels of all colors of the color liquid crystal element. This suppresses the occurrence of moiré.

In the liquid crystal display panel of Unexamined Japanese Patent Application Publication No. 2023-000275, a switching element (a thin film transistor) is located near the intersection of the first bus line and the second bus line. An area of a display unit (pixel) of a liquid crystal display panel is an integer multiple of an area of a pixel including multiple subpixels of a color display element. As such, the switching elements of the liquid crystal display panel are aligned in the first direction and the second direction at wide intervals and shield light that is incident on the color liquid crystal element from a backlight (in a case where the color liquid crystal element is disposed on an observer side) or light that is emitted from the color liquid crystal element (in a case where the liquid crystal display panel is disposed on the observer side). When switching elements block light at wide intervals, the switching elements stand out and dark areas caused by the switching elements may be recognized by an observer as display inconsistencies.

SUMMARY OF THE INVENTION

A liquid crystal display device of the present disclosure includes:
  a first liquid crystal display panel that displays a color display element and in which a first main pixel including a plurality of subpixels of different colors is disposed; and a second liquid crystal display panel that overlaps with the first liquid crystal display panel and displays a monochrome display element and in which a second main pixel corresponding to a plurality of the first main pixels is disposed, wherein
  the second liquid crystal display panel includes a switching element that drives the second main pixel and has light blocking properties, a first light blocking pattern that extends in a first direction that is predetermined, is arranged repeatedly, and has light blocking properties, a second light blocking pattern that extends in a second direction that is predetermined and perpendicular to the first direction, is arranged repeatedly, and has light blocking properties, and a plurality of light shields that have light blocking properties,
  the first light blocking pattern includes a first light blocking line that extends in the first direction and includes a first incline inclined with respect to the first direction and a second incline inclined in a direction opposite the first incline with respect to the first direction, and a second light blocking line that is adjacent to the first light blocking line and is line-symmetrical, with respect to the first direction, to the first light blocking line,
  the plurality of light shields is each located between a crossline and a symmetry axis of the first light blocking pattern within a region, the crossline connecting intersections of the first light blocking pattern and the second light blocking pattern and extending in the first direction, the region being a region that is surrounded by the first light blocking pattern and the second light blocking pattern and in which a spacing between the first light blocking line and the second light blocking line is continuously widen from both ends of the region in the first direction, and
  at least one of the first light blocking line or the second light blocking line is formed from a scan wiring of the second liquid crystal display panel.

It is to be understood that both the foregoing general description and the following detailed description are exemplary and explanatory and are not restrictive of this disclosure.

BRIEF DESCRIPTION OF DRAWINGS

A more complete understanding of this application can be obtained when the following detailed description is considered in conjunction with the following drawings, in which:

FIG. 7 is a plan view illustrating two regions of the second main pixel according to Embodiment 1;

FIG. 12 is a schematic drawing illustrating a first light blocking pattern and a second light blocking pattern corresponding to one second main pixel of a second liquid crystal display panel, switching elements and light shields of the second main pixel, and subpixels of the first liquid crystal display panel according to Embodiment 1;

FIG. 14 is a schematic drawing illustrating scan wirings and signal wirings corresponding to one second main pixel, switching elements and contact holes of the second main pixel, and light shields according to Embodiment 2;

FIG. 18 is a plan view illustrating a region of the second main pixel according to Embodiment 3;

FIG. 21 is a plan view illustrating a region of the second main pixel according to Embodiment 4;

FIG. 26 is a schematic drawing illustrating scan wirings and signal wirings corresponding to four second main pixels, switching elements and contact holes of the second main pixels, and light shields according to a modified example.

DETAILED DESCRIPTION OF THE INVENTION

Hereinafter, a liquid crystal display device according to various embodiments is described while referencing the drawings.

Embodiment 1

A liquid crystal display device 10 according to the present embodiment is described while referencing FIGS. 1 to 13. The liquid crystal display device 10 displays a color display element (characters, images, patterns, and the like) using a first liquid crystal display panel 100 and a second liquid crystal display panel 200, described later.

Figure 1:
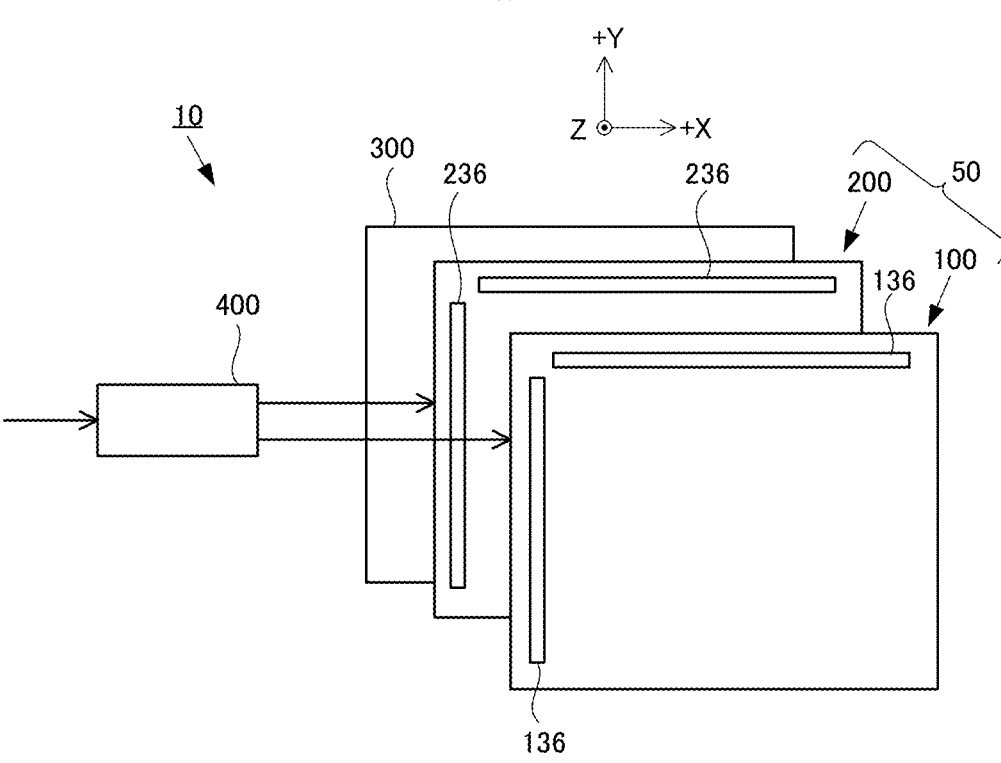
FIG. 1 is a schematic drawing illustrating a liquid crystal display device according to Embodiment 1.

As illustrated in FIG. 1, the liquid crystal display device 10 includes a panel section 50, a backlight 300, and a display controller 400. The panel section 50 includes the first liquid crystal display panel 100 and the second liquid crystal display panel 200. The backlight 300 is a light source that emits light on the first liquid crystal display panel 100 and the second liquid crystal display panel 200. The display controller 400 controls the displays of the first liquid crystal display panel 100 and the second liquid crystal display panel 200. Note that, in the present description, to facilitate comprehension, in the liquid crystal display device 10 of FIG. 1, the right direction (the right direction on paper) is referred to as the "+X direction", the up direction (the up direction on paper) is referred to as the "+Y direction", and the direction perpendicular to the +X direction and the +Y direction (the front direction on paper) is referred to as the "+Z direction."

Panel Section

The panel section 50 includes the first liquid crystal display panel 100 and the second liquid crystal display panel 200. The first liquid crystal display panel 100 is positioned on an observer side (the +Z side) and displays a color display element. The second liquid crystal display panel 200 is positioned on a side, opposite the surface of the observer side, of the first liquid crystal display panel 100 (a back surface side of the first liquid crystal display panel 100), and overlaps the first liquid crystal display panel 100. The second liquid crystal display panel 200 displays a monochrome display element.

First Liquid Crystal Display Panel

In one example, the first liquid crystal display panel 100 is implemented as a known transmissive horizontal electric field type liquid crystal display panel. The first liquid crystal display panel 100 is active matrix driven by a thin film transistor (TFT) elements.

Figure 2:
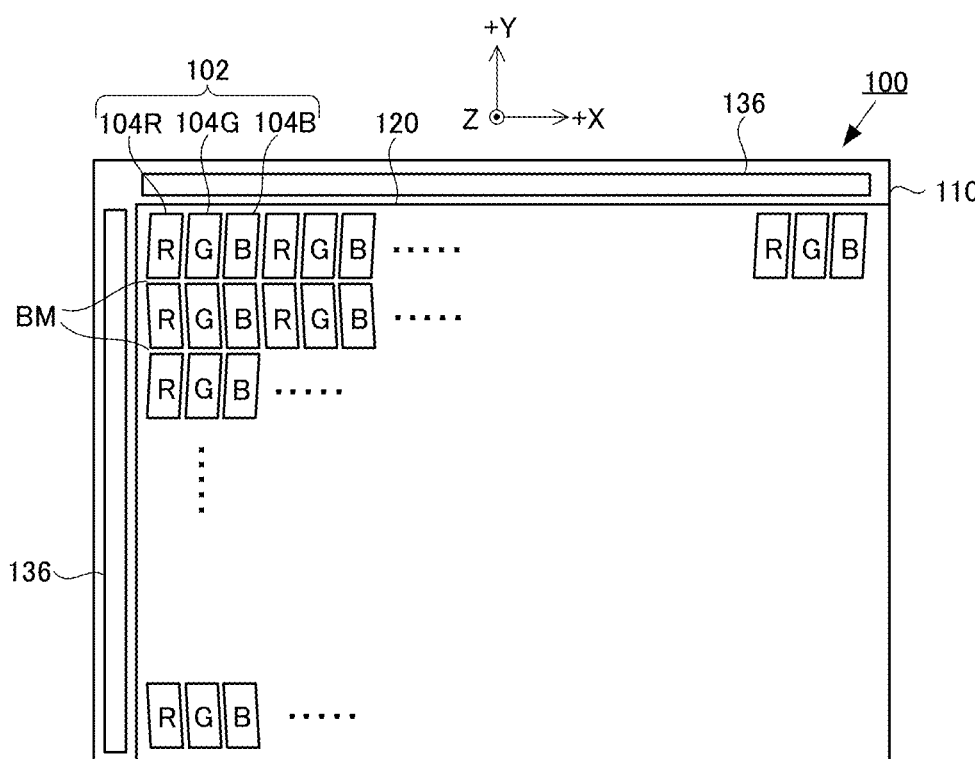
FIG. 2 is a plan view illustrating a first liquid crystal display panel according to Embodiment 1.

As illustrated in FIG. 2, the first liquid crystal display panel 100 includes a first main pixel 102 arranged in a matrix. The first main pixel 102 includes a red pixel 104R that emits red light, a green pixel 104G that emits green light, and a blue pixel 104B that emits blue light that are defined by a black matrix BM. Note that the red pixel 104R, the green pixel 104G, and the blue pixel 104B may be referred to collectively as "subpixels 104."

Figure 3:
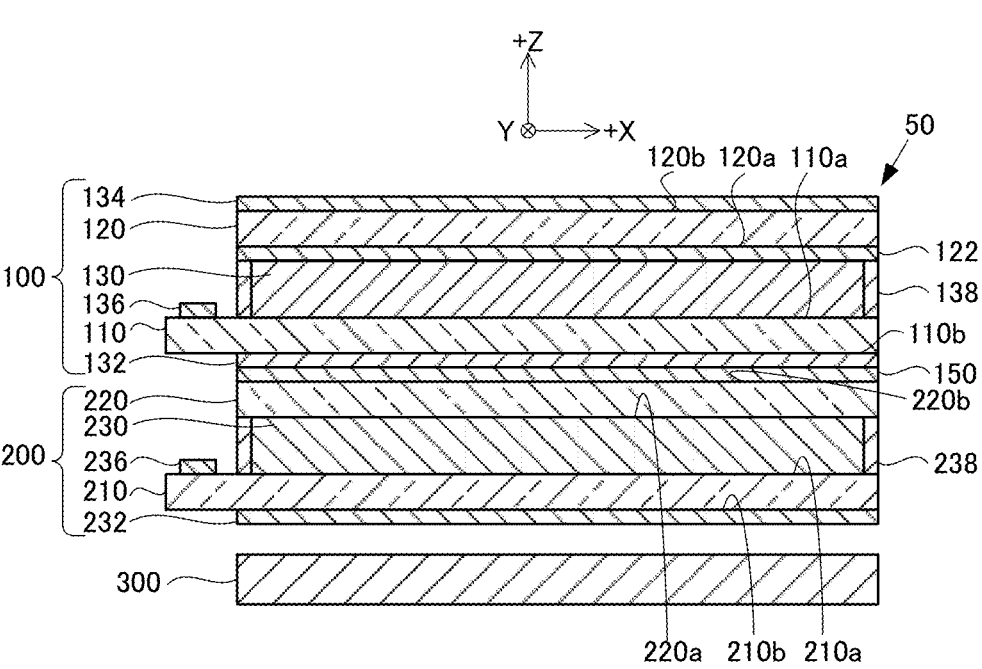
FIG. 3 is a cross-sectional view illustrating the liquid crystal display device according to Embodiment 1.

As illustrated in FIG. 3, the first liquid crystal display panel 100 includes a first TFT substrate 110, a first counter substrate 120, a first liquid crystal 130, a first polarizing plate 132, a second polarizing plate 134, and a first driver circuit 136. The first TFT substrate 110 and the first counter substrate 120 sandwich the first liquid crystal 130. The first polarizing plate 132 is provided to the first TFT substrate 110. The second polarizing plate 134 is provided to the first counter substrate 120.

In one example, the first TFT substrate 110 is implemented as a glass substrate. On a main surface 110a of the first TFT substrate 110 on the first liquid crystal 130 side, TFT elements for selecting the subpixels 104, a common electrode, pixel electrodes, and an alignment film for aligning the first liquid crystal 130 are provided (all not illustrated in the drawings).

Furthermore, a plurality of common wirings, a plurality of signal wirings, and a plurality of scan wirings (all not illustrated in the drawings) are formed on the main surface 110a of the first TFT substrate 110. The common wirings supply common potential to the common electrode that applies voltage to the first liquid crystal 130. The signal wirings supply, via the TFT elements, voltage to pixel electrodes that apply voltage to the first liquid crystal 130. The signal wirings extend in the Y direction and are bent along the outer shape of the subpixels 104. The scan wirings supply voltage for operating the TFT elements. The scan wirings extend linearly in the Y direction. The subpixels 104 are surrounded by the signal wirings and the scan wirings. The TFT elements are provided at intersections of the scan wirings and the signal wirings. The first polarizing plate 132 is provided on a main surface 110b on the side opposite the main surface 110a of the first TFT substrate 110.

As illustrated in FIG. 3, the first counter substrate 120 opposes the first TFT substrate 110 and is adhered to the first TFT substrate 110 by a seal material 138. In one example, the first counter substrate 120 is implemented as a glass substrate. A color filter 122, the black matrix BM, an alignment film for aligning the first liquid crystal 130, and the like are provided on a main surface 120a of the first counter substrate 120 on the first liquid crystal 130 side. In one example, the color filter 122 is implemented as a striped color filter in which color filters of the same color are disposed in the Y direction (color filter in which the stripe direction is the Y direction). A red color filter, a green color filter, and a blue color filter of the color filter 122 are each surrounded by the black matrix BM, and respectively correspond to the red pixel 104R, the green pixel 104G, and the blue pixel 104B. As illustrated in FIG. 2, the black matrix BM defines each first main pixel 102 and each subpixel 104. The second polarizing plate 134 is provided on a main surface 120b on the side opposite the main surface 120a of the first counter substrate 120. Note that, to facilitate comprehension, the black matrix BM, the alignment film, and the like are omitted from FIG. 3.

As illustrated in FIG. 3, the first liquid crystal 130 is sandwiched between the first TFT substrate 110 and the first counter substrate 120. In one example, the first liquid crystal 130 is implemented as a positive nematic liquid crystal. The first liquid crystal 130 is aligned, by the alignment film, in a direction parallel to the main surface 110a of the first TFT substrate 110. Additionally, the first liquid crystal 130 rotates in-plane parallel to the main surface 110a of the first TFT substrate 110 due to voltage being applied.

The first polarizing plate 132 is provided on the main surface 110b of the first TFT substrate 110. The second polarizing plate 134 is provided on the main surface 120b of the first counter substrate 120. Either one of the transmission axis of the first polarizing plate 132 and the transmission axis of the second polarizing plate 134 is arranged parallel to the alignment direction of the first liquid crystal 130, and the transmission axis of the first polarizing plate 132 and the transmission axis of the second polarizing plate 134 are orthogonal to each other. The first polarizing plate 132 is adhered, by a light-transmitting adhesive layer 150, to a hereinafter described second counter substrate 220 of the second liquid crystal display panel 200. In one example, the adhesive layer 150 is implemented as an optical clear adhesive (OCA).

The first driver circuit 136 is provided on the main surface 110a of the first TFT substrate 110. The first driver circuit 136 supplies, on the basis of a color signal supplied from the display controller 400, voltage to the scan wirings, the signal wirings, and the common wirings.

Second Liquid Crystal Display Panel

As illustrated in FIG. 3, the second liquid crystal display panel 200 is positioned on the back side (the −Z side) of the first liquid crystal display panel 100. The second liquid crystal display panel 200 is affixed to the first liquid crystal display panel 100 by the adhesive layer 150. The second liquid crystal display panel 200 displays a monochrome display element.

Figure 4:
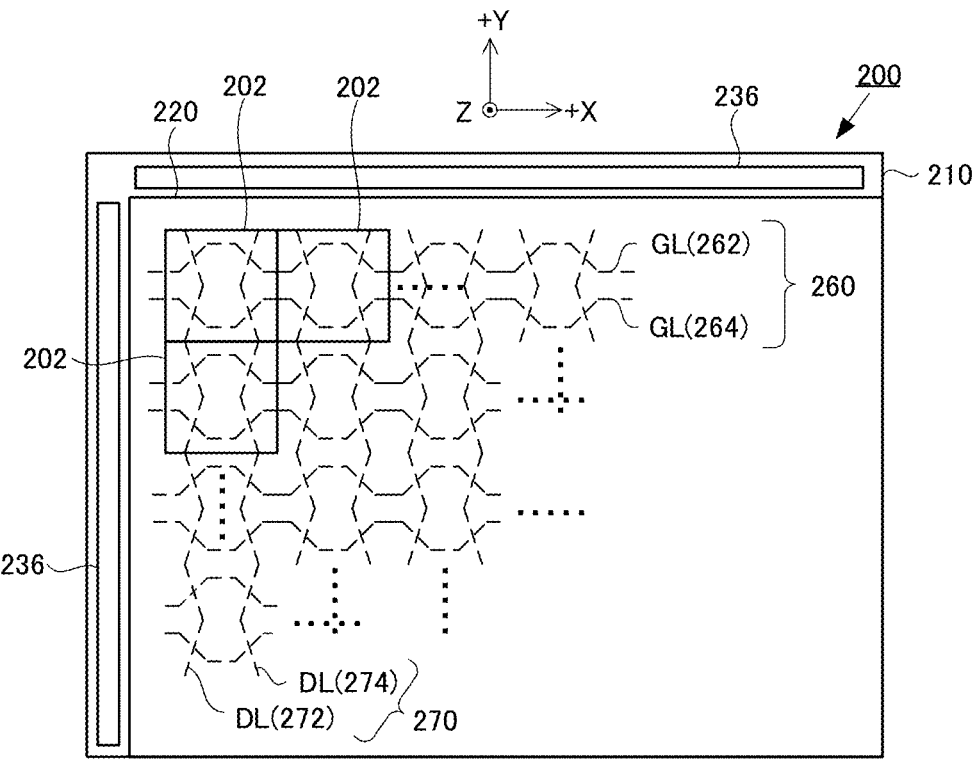
FIG. 4 is a plan view illustrating a second liquid crystal display panel according to Embodiment 1.

In the present embodiment, the second liquid crystal display panel 200 is implemented as a transmissive horizontal electric field type liquid crystal display panel that uses positive nematic liquid crystal. The second liquid crystal display panel 200 is active matrix driven by hereinafter described switching elements 240. As illustrated in FIG. 4, the second liquid crystal display panel 200 includes second main pixels 202 arranged in a matrix. In the present embodiment, one second main pixel 202 of the second liquid crystal display panel 200 corresponds to 16 (4×4) first main pixels 102 of the first liquid crystal display panel 100. The one second main pixel 202 of the second liquid crystal display panel 200 emits light on the 16 first main pixels 102 of the first liquid crystal display panel 100. Note that, in FIG. 4, the scan wirings GL and the signal wirings DL are illustrated as broken lines. In the drawings referred in the following, the scan wirings GL and the signal wirings DL may be illustrated as broken lines or solid lines.

As illustrated in FIG. 3, the second liquid crystal display panel 200 includes a second TFT substrate 210, a second counter substrate 220, a second liquid crystal 230, a third polarizing plate 232, and a second driver circuit 236. The second TFT substrate 210 and the second counter substrate 220 sandwich the second liquid crystal 230. The third polarizing plate 232 is provided on the second TFT substrate 210. In the present embodiment, the first polarizing plate 132 of the first liquid crystal display panel 100 also serves as a polarizing plate of the second liquid crystal display panel 200 on the light emission side.

In one example, the second TFT substrate 210 is implemented as a glass substrate. A plurality of scan wirings GL; a plurality of signal wirings DL; common wirings (not illustrated); switching elements 240, pixel electrodes 250, and a common electrode CE of the second main pixels 202; an alignment film (not illustrated) for aligning the second liquid crystal 230; and the like (all described later) are formed on a main surface 210a of the second TFT substrate 210, on the second liquid crystal 230 side. The common wirings supply common potential to the common electrode CE that apply voltage to the second liquid crystal 230. The signal wirings DL supply voltage, via the switching elements 240, to pixel electrodes 250 that apply voltage to the second liquid crystal 230. The scan wirings GL supply voltage for causing the switching elements 240 to operate. The third polarizing plate 232 is provided on a main surface 210b on the side opposite the main surface 210a of the second TFT substrate 210.

In the present embodiment, the scan wirings GL form a hereinafter described first light blocking pattern 260. The signal wirings DL form a hereinafter described second light blocking pattern 270. As described below, the switching elements 240 have light blocking properties. Furthermore, the end of a drain electrode 248, connected to the pixel electrodes 250, of the switching element 240 forms a light shield 280. Configurations of the scan wirings GL, the signal wirings DL, the second main pixels 202 (switching elements 240, pixel electrodes 250, etc.), and the like are described later.

The second counter substrate 220 opposes the second TFT substrate 210 and is adhered to the second TFT substrate 210 by a seal material 238. In one example, the second counter substrate 220 is implemented as a glass substrate. An alignment film (not illustrated) for aligning the second liquid crystal 230 is provided on a main surface 220a of the second counter substrate 220 on the second liquid crystal 230 side. The adhesive layer 150 is provided on a main surface 220b on the side opposite the main surface 220a of the second counter substrate 220. The second counter substrate 220 is adhered to the first liquid crystal display panel 100 (the first polarizing plate 132) via the adhesive layer 150.

The second liquid crystal 230 is sandwiched between the second TFT substrate 210 and the second counter substrate 220. In one example, the second liquid crystal 230 is implemented as a positive nematic liquid crystal. The second liquid crystal 230 is initially aligned in the Y direction by the alignment film. The second liquid crystal 230 rotates in-plane parallel to the main surface 210a of the second TFT substrate 210 due to voltage being applied.

The third polarizing plate 232 is provided on the main surface 210b of the second TFT substrate 210. The transmission axis of the third polarizing plate 232 is arranged parallel to the alignment direction of the second liquid crystal 230. Note that the transmission axis of the third polarizing plate 232 and the transmission axis of the first polarizing plate 132 of the first liquid crystal display panel 100 (the polarizing plate of the second liquid crystal display panel 200 on the light emission side) are orthogonal to each other. The second liquid crystal display panel 200 operates in a normally black mode.

The second driver circuit 236 is provided on the main surface 210a of the second TFT substrate 210. The second driver circuit 236 supplies, on the basis of a monochrome signal supplied from the display controller 400, voltage to the scan wirings GL, the signal wirings DL, and the common wirings.

Figure 5:
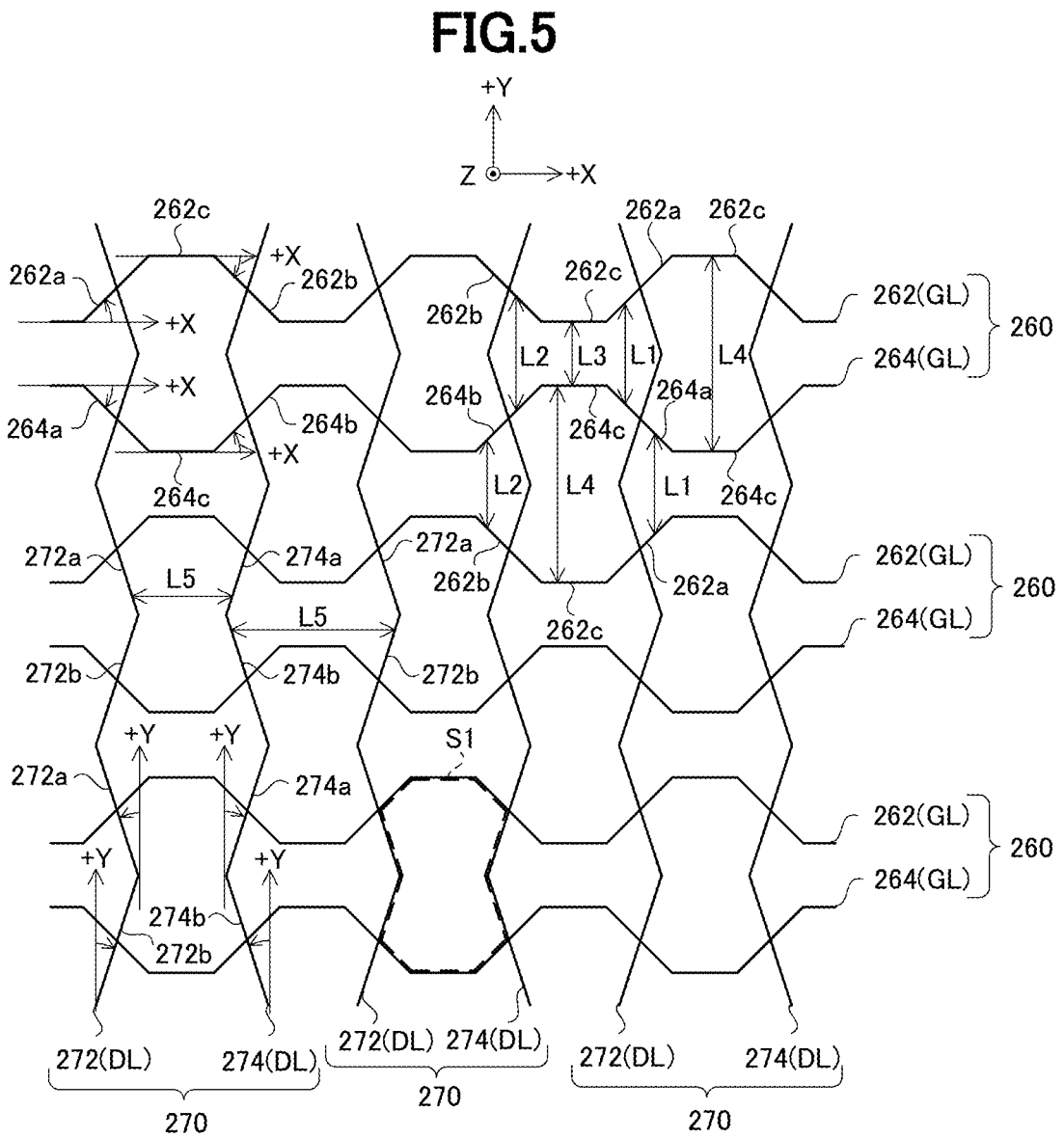
FIG. 5 is a schematic drawing illustrating a first light blocking pattern and a second light blocking pattern according to Embodiment 1.

Next, the scan wirings GL, the signal wirings DL, the first light blocking pattern 260, and the second light blocking pattern 270 are described while referencing FIGS. 4 and 5.

The scan wirings GL and the first light blocking pattern 260 are described. The scan wirings GL have light blocking properties. The scan wirings GL are formed from a metal (aluminum (Al), molybdenum (Mo), or the like). As illustrated in FIGS. 4 and 5, the scan wirings GL extend in the X direction and are arranged in the Y direction. Additionally, a pair of the scan wirings GL that are adjacent to each other form the first light blocking pattern 260 that extends in the X direction and has light blocking properties. The first light blocking pattern 260 is repeatedly arranged in the Y direction. Here, the term "light blocking properties" means blocking at least a portion of the light being incident. Furthermore, the X direction corresponds to a predetermined first direction in the present embodiment.

As illustrated in FIG. 5, one scan wiring GL (hereinafter also referred to as "first light blocking line 262") of the pair of scan wirings GL that are adjacent to each other includes a first incline 262a, a second incline 262b, and a first flat section 262c. The first incline 262a is inclined, at an acute angle, in a counterclockwise direction with respect to the +X direction. The second incline 262b is inclined, at an acute angle, in a direction opposite the first incline 262a (clockwise direction) with respect to the +X direction. The first flat section 262c extends parallel to the X direction, and connects the first incline 262a and the second incline 262b to each other.

The other scan wiring GL (hereinafter also referred to as "second light blocking line 264") of the pair of scan wirings GL that are adjacent to each other is line-symmetrical, with respect to the X direction, with the one scan wiring GL (the first light blocking line 262). The second light blocking line 264 includes a third incline 264a, a fourth incline 264b, and a second flat section 264c. The third incline 264a opposes the first incline 262a of the first light blocking line 262, and is inclined, at an acute angle, in the clockwise direction with respect to the +X direction. The fourth incline 264b opposes the second incline 262b of the first light blocking line 262, and is inclined, at an acute angle, in a direction opposite the third incline 264a (the counterclockwise direction) with respect to the +X direction. The second flat section 264c extends parallel to the X direction, opposes the first flat section 262c of the first light blocking line 262, and connects the third incline 264a and the fourth incline 264b to each other.

In the present embodiment, the first light blocking line 262 includes a first incline 262a and a second incline 262b that is inclined in a direction opposite the first incline 262a. Furthermore, the first light blocking line 262 and the second light blocking line 264 are line-symmetrical with respect to the X direction. Accordingly, as illustrated in FIG. 5, a spacing (spacing L1) between the first light blocking line 262 and the second light blocking line 264 continuously changes, along the X direction, between the first incline 262a of the first light blocking line 262 and the third incline 264a of the second light blocking line 264. Additionally a spacing (spacing L2) between the first light blocking line 262 and the second light blocking line 264 continuously changes, along the X direction, also between the second incline 262b of the first light blocking line 262 and the fourth incline 264b of the second light blocking line 264. Furthermore, spacings (spacing L3 and spacing L4) between the first flat section 262c of the first light blocking line 262 and the second flat section 264c of the second light blocking line 264 change along the Y direction. Due to these configurations, even when the second liquid crystal display panel 200 and the first liquid crystal display panel 100 overlap, spatial frequency interference between the second liquid crystal display panel 200 and the first liquid crystal display panel 100 can be suppressed and, as such, moiré of the liquid crystal display device 10 can be suppressed.

Next, the signal wirings DL and the second light blocking pattern 270 are described. As with the scan wirings GL, the signal wirings DL have light blocking properties. The signal wirings DL are formed from a metal (aluminum (Al), molybdenum (Mo), or the like). As illustrated in FIGS. 4 and 5, the signal wirings DL extend in the Y direction and are arranged in the X direction. Additionally, a pair of the signal wirings DL that are adjacent to each other form the second light blocking pattern 270 that extends in the Y direction and has light blocking properties. In the present embodiment, the Y direction corresponds to a predetermined second direction.

As illustrated in FIG. 5, one signal wiring DL (hereinafter also referred to as "third light blocking line 272") of the pair of signal wirings DL that are adjacent to each other includes a fifth incline 272a and a sixth incline 272b. The fifth incline 272a is inclined, at an acute angle, in the counterclockwise direction with respect to the +Y direction. The sixth incline 272*b* is inclined, at an acute angle, in the direction opposite the fifth incline 272*a* (clockwise direction) with respect to the +Y direction.

The other signal wiring DL (hereinafter also referred to as "fourth light blocking line 274") of the pair of signal wirings DL that are adjacent to each other is line-symmetrical, with respect to the Y direction, with the one signal wiring DL (the third light blocking line 272). The fourth light blocking line 274 includes a seventh incline 274*a* and a eighth incline 274*b*. The seventh incline 274*a* opposes the fifth incline 272*a* of the third light blocking line 272, and is inclined, at an acute angle, in the clockwise direction with respect to the +Y direction. The eighth incline 274*b* opposes the sixth incline 272*b* of the third light blocking line 272, and is inclined, at an acute angle, in the direction opposite the seventh incline 274*a* (the counterclockwise direction) with respect to the +Y direction.

In the present embodiment, the third light blocking line 272 includes a fifth incline 272*a* and a sixth incline 272*b* that is inclined in a direction opposite the fifth incline 272*a*. Furthermore, the third light blocking line 272 and the fourth light blocking line 274 are line-symmetrical with respect to the Y direction. Accordingly, as illustrated in FIG. 5, a spacing L5 between the third light blocking line 272 and the fourth light blocking line 274 continuously changes. Due to these configurations, even when the second liquid crystal display panel 200 and the first liquid crystal display panel 100 overlap, spatial frequency interference between the second liquid crystal display panel 200 and the first liquid crystal display panel 100 can be suppressed and, as such, moiré of the liquid crystal display device 10 can be suppressed.

Figure 6:
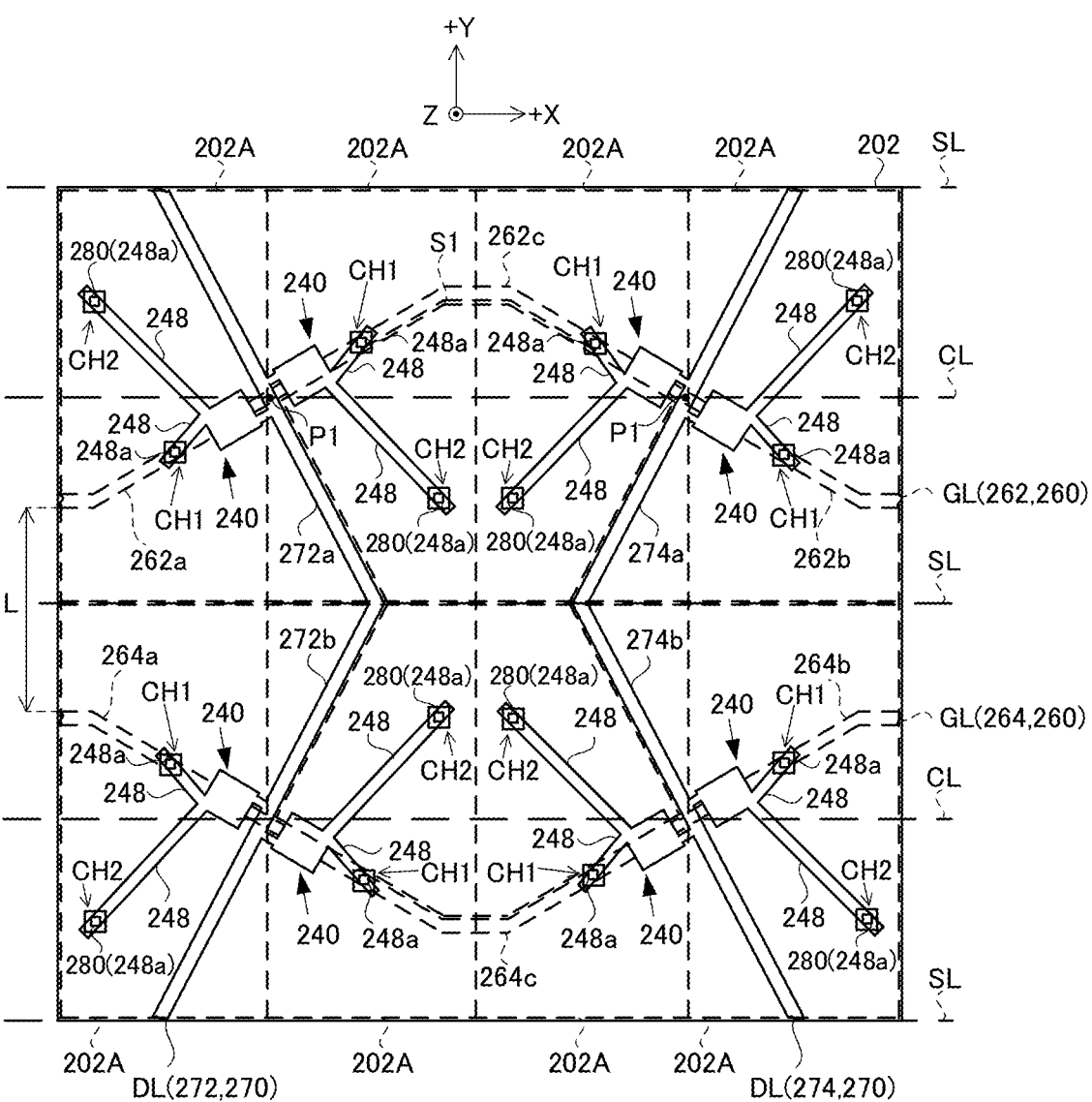
FIG. 6 is a schematic drawing illustrating scan wirings and signal wirings corresponding to one second main pixel, switching elements and contact holes of the second main pixel, and light shields according to Embodiment 1.

Next, the scan wirings GL (the first light blocking line 262 and the second light blocking line 264), the signal wirings DL (the third light blocking line 272 and the fourth light blocking line 274), and the second main pixel 202 are described while referencing FIGS. 6 to 11. FIG. 6 illustrates scan wirings GL and signal wirings DL corresponding to one second main pixel 202, switching elements 240 and contact holes CH1, CH2 of the second main pixel 202, and light shields 280. As illustrated in FIG. 6, the second main pixel 202 substantially has a rectangular shape. The second main pixel 202 is divided into eight regions 202A in two rows and four columns in the X direction and the Y direction. Note that, in FIG. 6, to facilitate comprehension, the switching elements 240, the contact holes CH1, CH2, and the light shields 280 are illustrated by solid lines and are illustrated in a simplified manner. For convenience, the contact holes CH1, CH2 and the light shields 280 are illustrated as rectangles, but the shapes of the contact holes CH1, CH2 and the light shields 280 are not limited to the rectangles. The switching elements 240, the contact holes CH2, the light shields 280, and the like are sometimes illustrated in a simplified manner in the drawings referred in the following as well.

Figure 7:
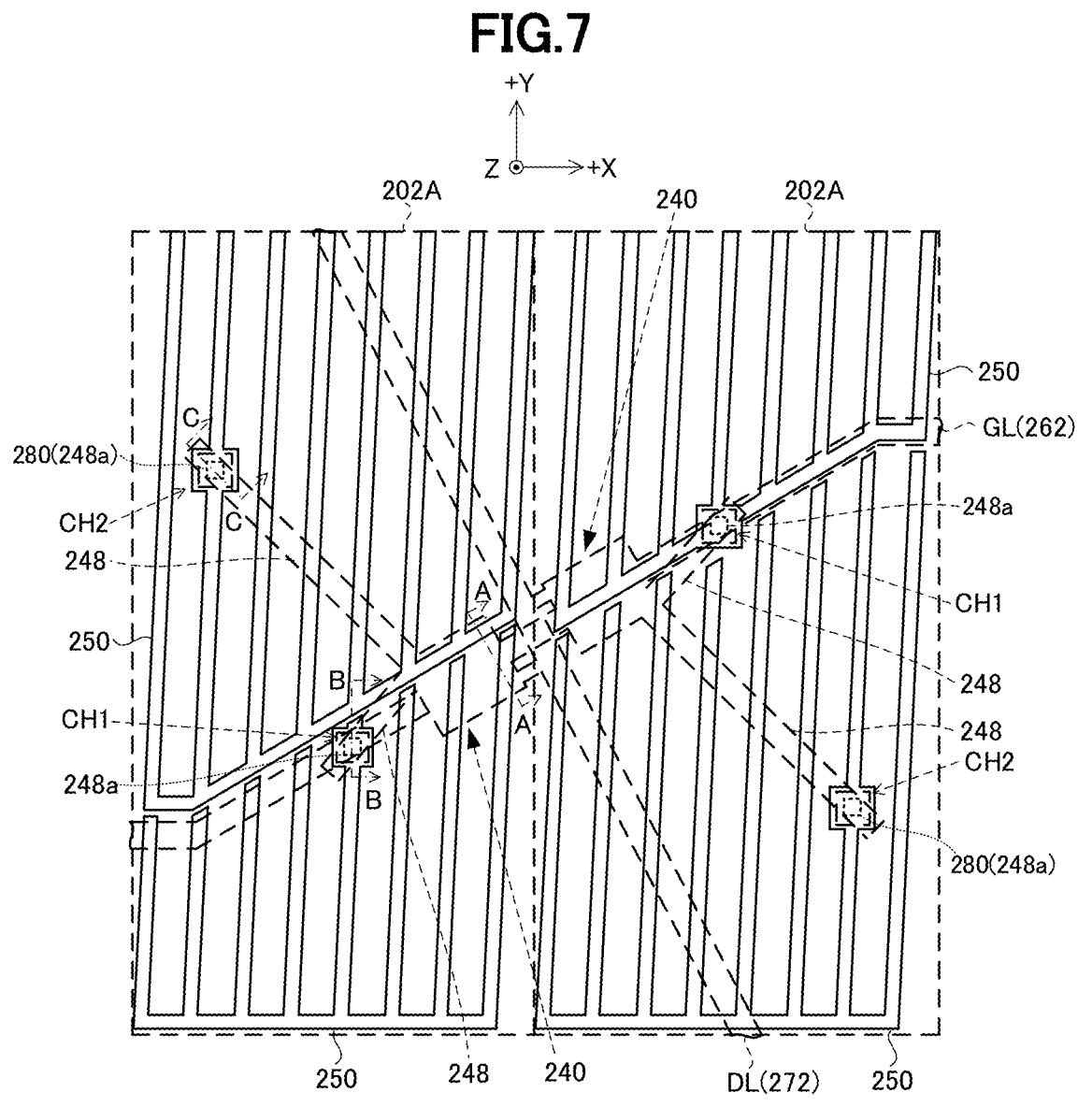

FIG. 7 illustrates two regions 200A among eight regions 202A of the second main pixel 202. As illustrated in FIG. 7, two pixel electrodes 250 are disposed in each region 202A. The two pixel electrodes 250 disposed in one region 202A are connected to one switching element 240. One second main pixel 202 (16 pixel electrodes 250) is driven by voltage (signals) from a pair of adjacent scan wirings GL and a pair of adjacent signal wirings DL. That is, identical gate signals and identical data signals are simultaneously input into each of the eight switching elements 240. Note that, the pair of adjacent scan wirings GL may be implemented as two scan wirings GL that branch from one scan wiring. The pair of adjacent signal wirings DL may be implemented as two signal wirings DL that branch from one signal wiring. Note that, to facilitate comprehension, the common electrode CE is omitted from FIG. 7. In some of the drawings referred in the following as well, the common electrode CE may be omitted.

One second main pixel 202 includes eight switching elements 240, 16 pixel electrodes 250, 16 contact holes CH1, CH2, and a common electrode CE. The switching elements 240 and the contact holes CH1, CH2 of the second main pixel 202, and the scan wirings GL and the signal wirings DL corresponding to the one second main pixel 202 are line-symmetrical with respect to the X direction and the Y direction.

Figure 9:
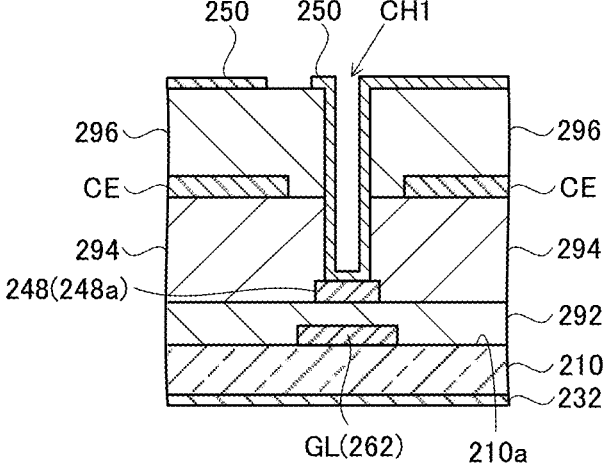
FIG. 9 is a cross-sectional view of a contact hole illustrated in FIG. 7, taken along line B-B.

As illustrated in FIG. 9, the scan wirings GL (the first light blocking line 262 and the second light blocking line 264) are formed on the main surface 210*a* of the second TFT substrate 210, and are covered by a first insulating layer 292. The signal wirings DL (the third light blocking line 272 and the fourth light blocking line 274) are formed on the first insulating layer 292, and are covered by a hereinafter described second insulating layer 294.

Figure 8:
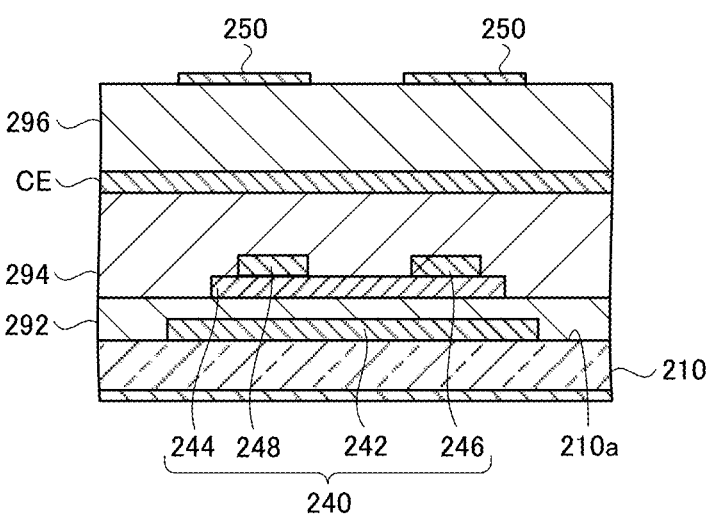
FIG. 8 is a cross-sectional view of a switching element illustrated in FIG. 7, taken along line A-A.
Figure 10:
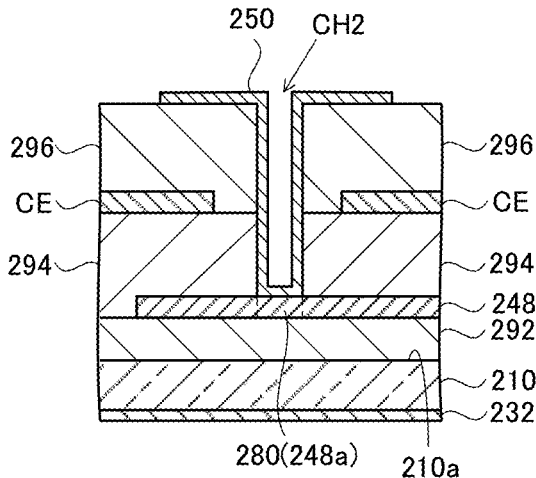
FIG. 10 is a cross-sectional view of a contact hole and a light shield illustrated in FIG. 7, taken along line C-C.

As illustrated in FIGS. 8 to 10, the common electrode CE of the second main pixel 202 is formed on the second insulating layer 294. In one example, the common electrode CE is formed from indium tin oxide (ITO). The common electrode CE is covered by a third insulating layer 296.

As illustrated in FIG. 7, each pixel electrode 250 of the second main pixel 202 has a comb-teeth shape. Two pixel electrodes 250 are disposed in one region 202A. The two pixel electrodes 250 disposed in one region 202A are connected to one switching element 240 (drain electrode 248). As illustrated in FIGS. 8 to 10, the pixel electrodes 250 are formed on the third insulating layer 296. In one example, the pixel electrodes 250 are formed from ITO. The pixel electrodes 250 and the common electrode CE provide an auxiliary capacity for holding the signal voltage applied to the second liquid crystal 230.

As illustrated in FIGS. 6 and 7, the switching elements 240 of the second main pixel 202 are disposed along the scan wirings GL (the first light blocking line 262 and the second light blocking line 264). In the present embodiment, the two switching elements 240 are disposed across an intersection P1 of the scan wiring GL and the signal wiring DL. In other words, the two switching elements 240 are disposed along the first incline 262*a* and the second incline 262*b* of the first light blocking line 262 and the third incline 264*a* and the fourth incline 264*b* of the second light blocking line 264 across the intersection P1 of the first light blocking pattern 260 (first light blocking line 262 and the second light blocking line 264) and the second light blocking pattern 270 (the third light blocking line 272 and the fourth light blocking line 274).

The switching elements 240 have light blocking properties. In the present embodiment, each of the switching elements 240 also functions as a light shield that shields the light that is emitted from the backlight 300 and that is incident on the subpixels 104 (first main pixels 102) of the first liquid crystal display panel 100.

Figure 11:
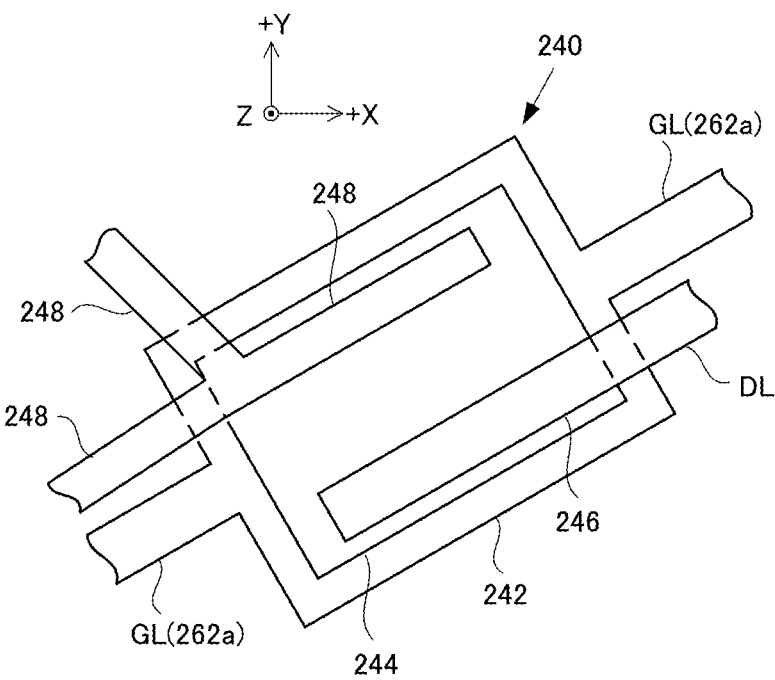
FIG. 11 is a plan view illustrating a switching element according to Embodiment 1.

As illustrated in FIGS. 8 and 11, each of the switching elements 240 includes a gate electrode 242, a semiconductor layer 244, a source electrode 246, and a drain electrode 248. The gate electrode 242, the source electrode 246, and the drain electrode 248 are formed from a metal having light blocking properties, such as aluminum (Al), molybdenum (Mo), or the like. In one example, the semiconductor layer 244 is formed from amorphous silicon. In one example, the switching elements 240 are implemented as TFT elements. Note that the first insulating layer 292 is omitted from FIG. 11.

The gate electrode 242 is formed, integrally with the scan wiring GL, on the main surface 210a of the second TFT substrate 210. As with the scan wiring GL, the gate electrode 242 is covered by the first insulating layer 292. Since the gate electrode 242 that is formed on the same layer as the scan wirings GL (first light blocking line 262 and second light blocking line 264) is formed from a metal having light blocking properties, the switching elements 240 have light blocking properties and also function as light shields.

The semiconductor layer 244 is provided, via the first insulating layer 292, in an island manner above the gate electrode 242. The source electrode 246 is formed integrally with the signal wiring DL.

The drain electrode 248 is branched into two drain electrodes 248. Each of the branched drain electrodes 248 connects to the pixel electrode 250 at a contact portion 248a, via the contact hole CH1 or the contact hole CH2 that penetrates the third insulating layer 296 and the second insulating layer 294 (FIGS. 7, 9, and 10). As the contact portion 248a of the drain electrode 248 connects, via the contact hole CH1 or the contact hole CH2 that penetrates the third insulating layer 296 and the second insulating layer 294, to the pixel electrode 250 formed from ITO having light transmissive properties, the contact portion 248a functions as a light shield that shields light.

When viewed from above, the contact portion 248a of the drain electrode 248 that connects to the one pixel electrode 250 via the contact hole CH1 is positioned above the scan wiring GL (FIGS. 6, 7, and 9). The contact portion 248a of the drain electrode 248 that connects to the other pixel electrode 250 via the contact hole CH2 is located between a crossline CL and a symmetry axis SL of the scan wirings GL within a region S1, the crossline CL connecting the intersections P1 of the scan wirings GL and the signal wirings DL and extending in the first direction, the region S1 being a region that is surrounded by the scan wirings GL and the signal wirings DL and in which a spacing L of the pair of scan wirings GL is continuously widen from the both ends of the region S1 in the X direction (FIG. 6). In other words, the contact portion 248a that connects to the other pixel electrode 250 via the contact hole CH2 is located between the crossline CL and the symmetry axis SL of the first light blocking pattern 260 within the region S1, the crossline CL connecting the intersections P1 of the first light blocking pattern 260 and the second light blocking pattern 270 and extending in the X direction, the region S1 being a region that is surrounded by the first light blocking pattern 260 (first light blocking line 262 and second light blocking line 264) and the second light blocking pattern 270 (third light blocking line 272 and fourth light blocking line 274) and in which a spacing L between the first light blocking line 262 and the second light blocking line 264 is continuously widen from the both ends of the region S1 in the X direction.

In the present embodiment, as the contact portion 248a of the drain electrode 248 that connects to the one pixel electrode 250 via the contact hole CH1 is positioned above the scan wiring GL, that is, above the first light blocking line 262 or the second light blocking line 264, the contact portion 248a does not substantially function as a light shield. Conversely, the contact portion 248a of the drain electrode 248 that connects to the other pixel electrode 250 via the contact hole CH2 functions as a light shield that shields light and forms a light shield 280. The light shields 280 shield light that is emitted from the backlight 300 and that is incident on the subpixels 104 (first main pixels 102) of the first liquid crystal display panel 100.

Therefore, as illustrated in FIG. 6, the light shield 280 corresponding to one switching element 240 is located between the crossline CL and the symmetry axis SL of the first light blocking pattern 260 within the region S1, the crossline CL connecting the intersections P1 of the first light blocking pattern 260 and the second light blocking pattern 270 and extending in the X direction, the region S1 being a region that is surrounded by the first light blocking pattern 260 (first light blocking line 262 and second light blocking line 264) and the second light blocking pattern 270 (third light blocking line 272 and fourth light blocking line 274) and in which a spacing L between the first light blocking line 262 and the second light blocking line 264 is continuously widen from the both ends of the region S1 in the X direction. Within the region S1, two light shields 280 are aligned in the X direction between the crossline CL and the symmetry axis SL in the region S1, and four light shields 280 are located within the region S1. The four light shields 280 are located line-symmetrically with respect to the X direction and the Y direction.

As illustrated in FIGS. 8 to 10, the first insulating layer 292 covers the scan wiring GL, and the gate electrode 242 of the switching element 240. The second insulating layer 294 covers the semiconductor layer 244, the source electrode 246, and the drain electrode 248 of the switching element 240, and the first insulating layer 292. The third insulating layer 296 covers the common electrode CE and the second insulating layer 294. The first insulating layer 292, the second insulating layer 294, and the third insulating layer 296 are formed from silicon nitride (SiN$_x$), silicon oxide (SiO$_x$), or the like.

In the present embodiment, one second main pixel 202 corresponds to 16 (4×4) first main pixels 102 of the first liquid crystal display panel 100. As such, the switching elements 240 having light blocking properties are aligned in the X direction and the Y direction with wide spacings therebetween, as illustrated in FIG. 6. Therefore, if the light that is emitted from the backlight 300 and that is incident on the subpixels 104 of the first liquid crystal display panel 100 is blocked only by the switching elements 240, spacings between dark areas caused by the switching elements 240 will be wide, and the dark areas caused by the switching elements 240 may be recognized as display inconsistencies by an observer.

In the present embodiment, the light shields 280 are located between the crossline CL and the symmetry axis SL within the region S1, and shield the light that is emitted from the backlight 300 and that is incident on the subpixels 104 of the first liquid crystal display panel 100. As a result, the dark areas are formed due to each of the switching elements 240 and the light shields 280, and the spacings between the dark areas are narrowed. This suppresses the perception of dark areas as display inconsistencies by the observer. That is, display inconsistencies by the dark areas can be suppressed.

Next, the arrangement of the first light blocking pattern 260 (scan wirings GL), the second light blocking pattern 270 (signal wirings DL), the switching elements 240, and the light shields 280 overlapping the subpixels 104 of the first liquid crystal display panel 100 is described.

Figure 12:
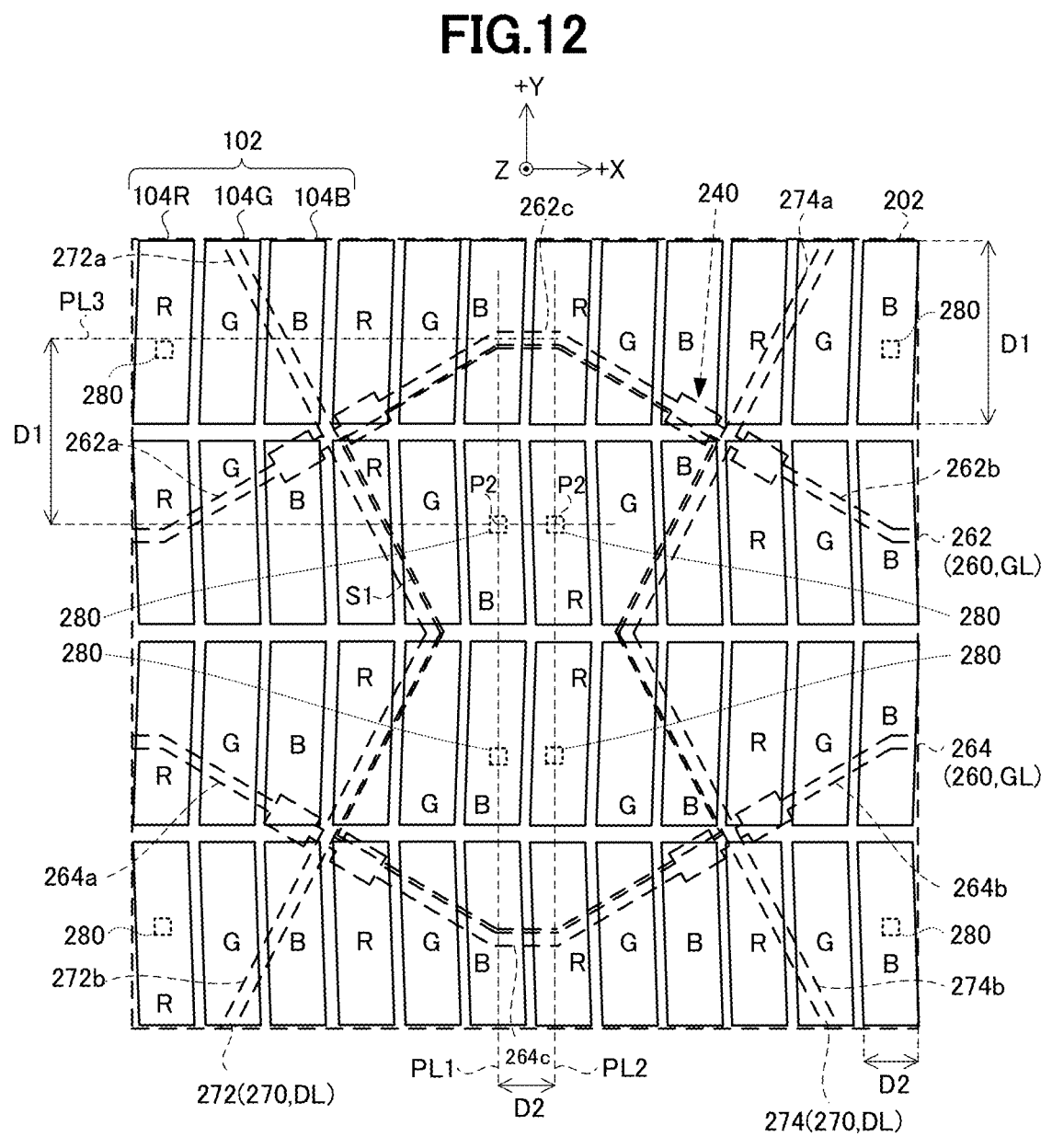

As illustrated in FIG. 12, in the first light blocking pattern 260, the first incline 262a and the second incline 262b of the first light blocking line 262 and the third incline 264a and the fourth incline 264b of the second light blocking line 264 are inclined across the plurality of subpixels 104 (104R, 104G, 104B) of different colors of the first liquid crystal display panel 100. Due to this, the brightness of the subpixels 104 that overlap with the first light blocking pattern 260 slightly decreases, and the first main pixels 102 that include the subpixels 104 that overlap with the first light blocking pattern 260 present a color that slightly differs from the color intended to be displayed. However, since the subpixels 104 in which a similar degree of reduction in brightness occurs are positioned in close proximity, the brightness of the subpixels 104 is averaged with respect to the observer observing the liquid crystal display device 10, and the observer recognizes the brightnesses of the plurality of subpixels 104 having the reduced brightness as the same brightness gradation. Accordingly, in terms of the entire display of the liquid crystal display device 10, it is possible to suppress recognition of color moiré by the observer.

In the second light blocking pattern 270, the fifth incline 272a and the sixth incline 272b of the third light blocking line 272 and the seventh incline 274a and the eighth incline 274b of the fourth light blocking line 274 are inclined across the plurality of subpixels 104 (104R, 104B) of different colors of the first liquid crystal display panel 100. Due to this, as with the first light blocking pattern 260, the first main pixels 102 that include the subpixels 104 that overlap with the second light blocking pattern 270 present a color that slightly differs from the color intended to be displayed. However, the color presented by the first main pixels 102 that include the subpixels 104 that overlap with the second light blocking pattern 270 and the color presented by the first main pixels 102 positioned in the proximity of the first main pixels 102 that include the subpixels 104 that overlap with the second light blocking pattern 270 are recognized as different colors by the observer and the saturation of mixed colors also declines. Accordingly, in terms of the entire display of the liquid crystal display device 10, it is possible to suppress recognition of color moiré by the observer.

The switching elements 240 and the light shields 280 overlap a portion of subpixels 104. As illustrated in FIG. 12, it is preferable that the light shields 280 are located on a straight line PL1 that connects the one end of the first flat section 262c with the one end of the second flat section 264c and extends in the Y direction or on a straight line PL2 that connects the other end of the first flat section 262c with the other end of the second flat section 264c and extends in the Y direction. It is preferable that a center P2 of the light shield 280 is located away in the Y direction from a center line PL3, extending in the X direction, of the first flat section 262c or the second flat section 264c, with a space corresponding to one of the subpixels (a length D1 of the subpixels 104 in the Y direction). Furthermore, it is preferable that a space in the X direction between centers P2 of two light shields 280 aligned in the X direction is an amount corresponding to one of the subpixels (a length D2 of the subpixels 104 in the X direction). Such a configuration makes it possible to suppress the display inconsistencies by the dark areas.

Backlight

As illustrated in FIGS. 1 and 3, the backlight 300 is arranged on the back side surface (the –Z side) of the second liquid crystal display panel 200. In one example, the backlight 300 is implemented as a direct backlight. The backlight 300 includes a white light emitting diode (LED), a reflective sheet, a diffusion sheet, and the like (all not illustrated in the drawings).

Figure 13:
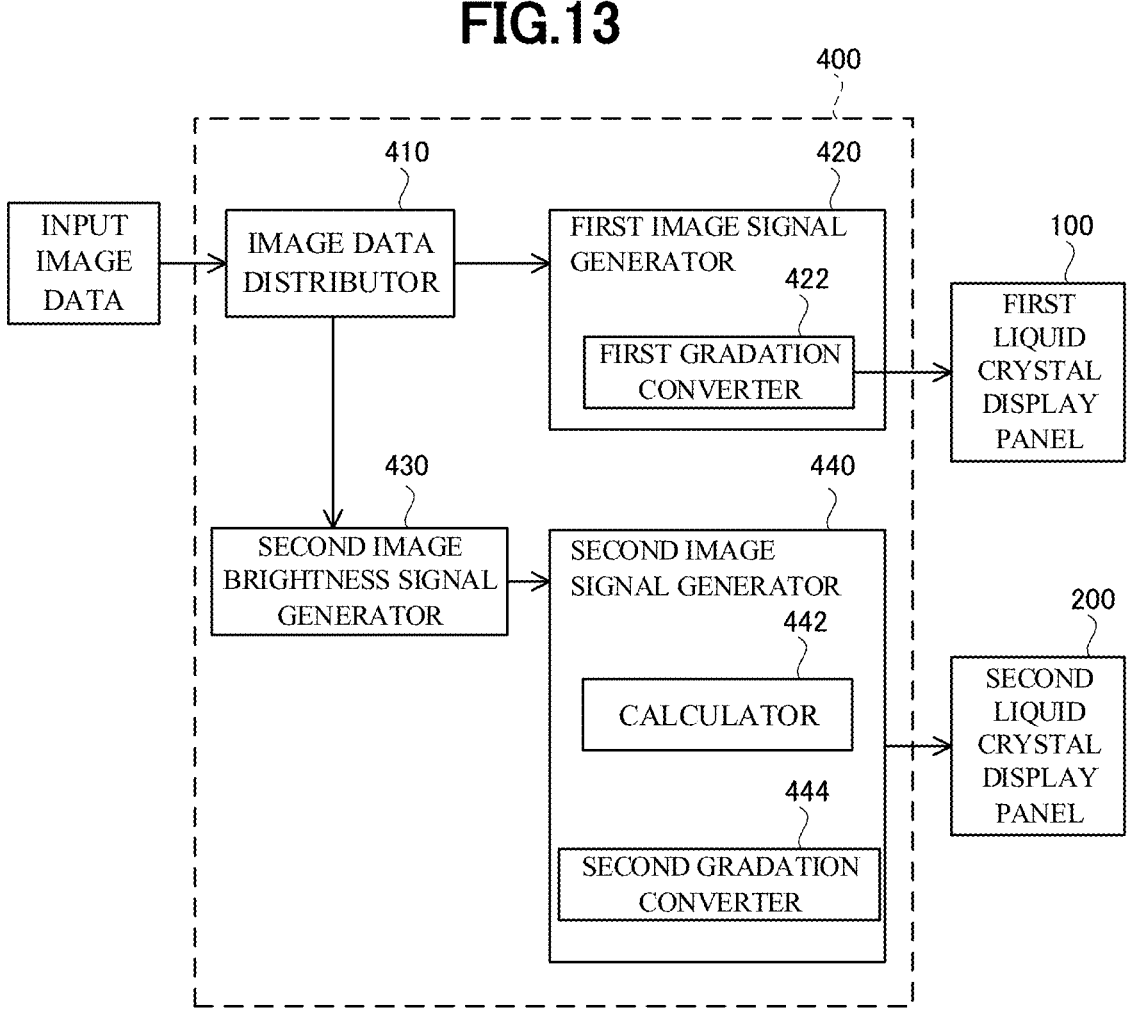
FIG. 13 is a block diagram illustrating a display controller according to Embodiment 1.

The display controller 400 controls the displays of the first liquid crystal display panel 100 and the second liquid crystal display panel 200. As illustrated in FIG. 13, the display controller 400 includes an image data distributor 410, a first image signal generator 420, a second image brightness signal generator 430, and a second image signal generator 440.

The image data distributor 410 distributes input image data to the first image signal generator 420 and the second image brightness signal generator 430.

The first image signal generator 420 generates, from the input image data distributed by the image data distributor 410, a color display element to be displayed on the first liquid crystal display panel 100. Specifically, a first gradation converter 422 of the first image signal generator 420 performs gradation conversion for converting the distributed input image data to color data having brightness-gradation characteristics suited to the first liquid crystal display panel 100. In one example, a lookup table in which input/output relationships are preset is used in the conversion of the data. The first image signal generator 420 sends a color signal expressing the generated color display element to the first driver circuit 136 of the first liquid crystal display panel 100.

The second image brightness signal generator 430 generates, from the input image data distributed by the image data distributor 410, a brightness signal for generating a monochrome display element to be displayed on the second liquid crystal display panel 200. In one example, the second image brightness signal generator 430 calculates the brightness level of one second main pixel 202 of the second liquid crystal display panel 200 from an average value, a frequency value, a minimum value, a maximum value, and the like of a red gradation value, a green gradation value, and a blue gradation value of the 16 first main pixels 102 of the first liquid crystal display panel 100 into which the light emitted from the one second main pixel 202 of the second liquid crystal display panel 200 enters. The calculated brightness level may be a gradation value. The second image brightness signal generator 430 sends a brightness signal expressing the calculated brightness level to the second image signal generator 440.

The second image signal generator 440 generates, on the basis of the brightness signal sent from the second image brightness signal generator 430, the monochrome display element to be displayed on the second liquid crystal display panel 200. In one example, the second image signal generator 440 generates a monochrome display element that has been subjected to averaging processing and gradation conversion. Specifically, in one example, a calculator 442 of the second image signal generator 440 uses a weighted average based on the distance from a target second main pixel 202 to average the brightness levels of the second main pixels 202 located within a predetermined distance from the target second main pixel 202. Due to this, the second image signal generator 440 can generate a monochrome display element that has blurred edges. Furthermore, a second gradation converter 444 of the second image signal generator 440 generates monochrome data having brightness-gradation characteristics suited to the second liquid crystal display panel 200. The configuration of the second gradation converter 444 is the same as that of the first gradation converter 422 of the first image signal generator 420. The second gradation converter 444 sends a monochrome signal expressing the generated monochrome display element to the second driver circuit 236 of the second liquid crystal display panel 200.

The monochrome signal sent to the second liquid crystal display panel 200 is delayed, by the calculation of the brightness level, the averaging processing, and the like executed by the second image brightness signal generator 430, with respect to the color signal sent to the first liquid crystal display panel 100. As such, the display controller 400 includes a non-illustrated synchronization circuit for synchronizing the outputting of the monochrome signal and the color signal. Due to this synchronization circuit, the monochrome display element corresponding to the color display element of the first liquid crystal display panel 100 is displayed on the second liquid crystal display panel 200 and, as such, an appropriate color display element is displayed on the liquid crystal display device 10.

The display controller 400 is configured from a graphic processing unit (GPU), a memory, a timing controller, a power supply circuit, and the like. In one example, the GPU processes the input data stored in the memory, and the timing controller generates, on the basis of the processed data, signals corresponding to the first liquid crystal display panel 100 and the second liquid crystal display panel 200, to realize the functions of the display controller 400.

As described above, the first light blocking pattern 260 (the scan wirings GL) of the second liquid crystal display panel 200 is formed from the first light blocking line 262 including the first incline 262*a*, the second incline 262*b*, and the first flat section 262*c* that connects the first incline 262*a* and the second incline 262*b* to each other, and the second light blocking line 264 that is line-symmetrical, with respect to the X direction, with the first light blocking line 262. As a result, the spatial frequency interference in the first liquid crystal display panel 100 and the second liquid crystal display panel 200 can be suppressed and, as such, the moiré of the liquid crystal display device 10 can be suppressed. Furthermore, the occurrence of color moiré can also be suppressed.

Additionally, the second light blocking pattern 270 (the signal wirings DL) of the second liquid crystal display panel 200 is formed from the third light blocking line 272 including the fifth incline 272*a* and the sixth incline 272*b*, and the fourth light blocking line 274 that is line-symmetrical, with respect to the Y direction, with the third light blocking line 272. As a result, the spatial frequency interference in the first liquid crystal display panel 100 and the second liquid crystal display panel 200 can be suppressed and, as such, the moiré of the liquid crystal display device 10 can be suppressed. Furthermore, the occurrence of color moiré can also be suppressed.

Furthermore, the light shields 280 are located between the crossline CL and the symmetry axis SL of the first light blocking pattern 260 within the region S1, the crossline CL connecting the intersections P1 of the first light blocking pattern 260 and the second light blocking pattern 270 and extending in the X direction, the region S1 being a region that is surrounded by the first light blocking pattern 260 and the second light blocking pattern 270 and in which the spacing L between the first light blocking line 262 and the second light blocking line 264 is continuously widen from the both ends of the region S1 in the X direction. As a result, the spacings between the dark areas caused by the switching elements 240 and the light shields 280 are narrowed and, as such, the display inconsistencies caused by the light shields (switching elements 240 and light shields 280) can be suppressed. As a result, the liquid crystal display device 10 can suppress moiré and also suppress display inconsistencies caused by the light shields.

In the present embodiment, one switching element 240 connects to two pixel electrodes 250. Therefore, even if a defect occurs in a pixel electrode 250, the defective area within the second main pixel 202 can be minimized and the yield of manufacturing the second liquid crystal display panel 200 can be improved.

Embodiment 2

In Embodiment 1, the light shields 280 of the second liquid crystal display panel 200 are formed from the contact portions 248*a* of the drain electrodes 248. However, a configuration is possible in which the light shield 280 is formed from a dummy light blocking layer.

As with the liquid crystal display device 10 of Embodiment 1, a liquid crystal display device 10 of the present embodiment includes a panel section 50, a backlight 300, and a display controller 400. The configurations of the first liquid crystal display panel 100, the first light blocking pattern 260 and the second light blocking pattern 270 (the scan wirings GL and the signal wirings DL) of the second liquid crystal display panel 200, the backlight 300, the display controller 400, and the like in the present embodiment are the same as the configurations thereof in Embodiment 1. Here, the second main pixels 202 and the light shields 280 of the second liquid crystal display panel 200 are described.

In the present embodiment as well, the second liquid crystal display panel 200 includes a second main pixel 202 arranged in a matrix (FIG. 4). Furthermore, one second main pixel 202 of the second liquid crystal display panel 200 corresponds to 16 (4×4) first main pixels 102 of the first liquid crystal display panel 100.

Figure 14:
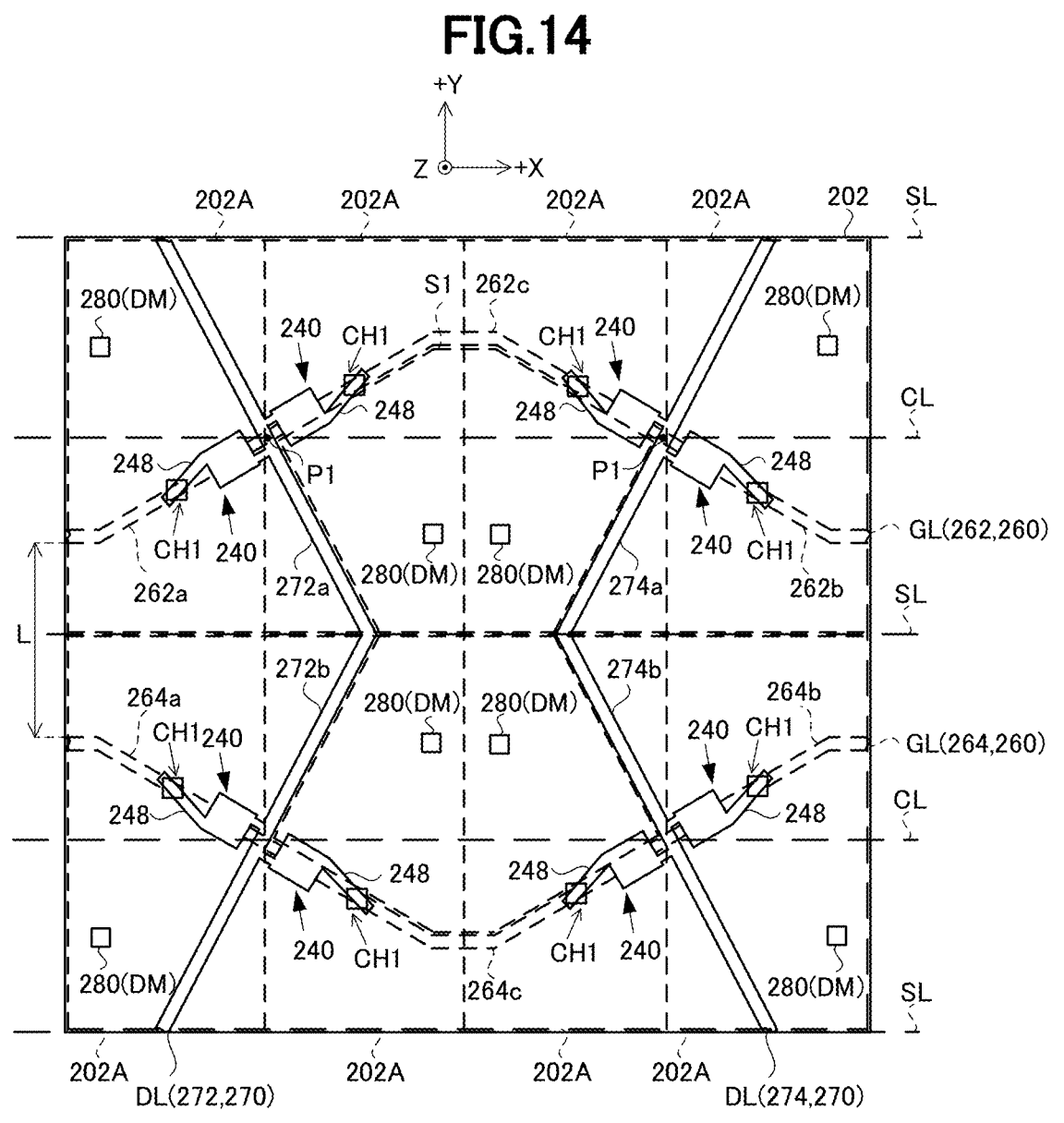
Figures 15, 16:
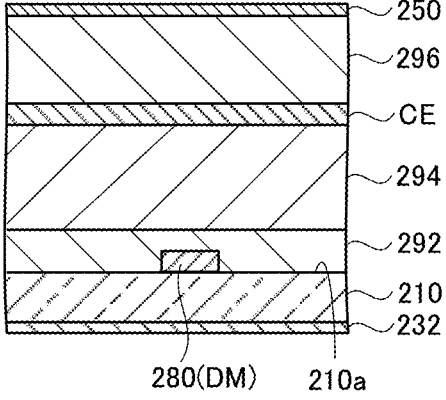
FIG. 15 is a plan view illustrating two regions of the second main pixel according to Embodiment 2.
FIG. 16 is a cross-sectional view of the light shield illustrated in FIG. 15, taken along line D-D.

As illustrated in FIG. 14, the second main pixel 202 of the present embodiment has a rectangular shape and is divided into eight regions 202A, in two rows and four columns, in the X direction and the Y direction. As illustrated in FIG. 15, one pixel electrode 250 is disposed in each region 202A. One pixel electrode 250 disposed in one region 202A connects to one switching element 240. As with Embodiment 1, one second main pixel 202 (eight pixel electrodes 250) is driven by voltage (signals) from a pair of adjacent scan wirings GL and a pair of adjacent signal wirings DL.

As illustrated in FIG. 15, each pixel electrode 250 of the second main pixel 202 of the present embodiment has a comb-teeth shape. In the present embodiment, one pixel electrode 250 is disposed in one region 202A. One pixel electrode 250 connects to one switching element 240 (a contact portion 248*a* of a drain electrode 248) via a contact hole CH1 located above the scan wiring GL (a first light blocking line 262 and a second light blocking line 264). In the present embodiment, as the contact portion 248*a* of the drain electrode 248 that connects to the one pixel electrode 250 via the contact hole CH1 is positioned above the scan wiring GL, the contact portion 248*a* does not substantially function as a light shield as with Embodiment 1.

The switching elements 240 of the second main pixel 202 of the present embodiment are arranged along the scan wirings GL (FIGS. 14 and 15), as with Embodiment 1. In the present embodiment as well, two switching elements 240 are disposed across the intersection P1 of the scan wiring GL and the signal wiring DL (a third light blocking line 272 and a fourth light blocking line 274).

In the present embodiment as well, the switching elements 240 have light blocking properties. The configuration of the switching elements 240 of the present embodiment is the same as the configuration of the switching elements 240 of Embodiment 1, except that the drain electrodes 248 do not branch, and one drain electrode 248 is connected to one switching element 240 via a contact hole CH1 located above the scan wiring GL.

As with the light shields 280 of Embodiment 1, the light shields 280 of the present embodiment are located between a crossline CL and a symmetry axis SL of the first light blocking pattern 260 within a region S1, the crossline CL connecting the intersections P1 of the first light blocking pattern 260 and the second light blocking pattern 270 and extending in the X direction, the region S1 being a region that is surrounded by the first light blocking pattern 260 (the first light blocking line 262 and the second light blocking line 264) and the second light blocking pattern 270 (the third light blocking line 272 and the fourth light blocking line 274) and in which a spacing L between the first light blocking line 262 and the second light blocking line 264 is continuously widen from the both ends of the region S1 in the X direction (FIG. 14). Furthermore, two light shields 280 are aligned in the X direction between the crossline CL and the symmetry axis SL in the region S1, and four light shields 280 are located within the region S1. The four light shields 280 are located line-symmetrically with respect to the X direction and the Y direction.

The light shields 280 of the present embodiment are formed from a dummy light blocking layer DM made from a metal, an organic material, or the like having light blocking properties. In one example, as illustrated in FIG. 16, the light shield 280 (the dummy light blocking layer DM) is formed on the main surface 210a of the second TFT substrate 210.

The configurations of the first light blocking pattern 260 and the second light blocking pattern 270 (the scan wirings GL and the signal wirings DL) and the arrangement of the switching elements 240 and the light shields 280 in the present embodiment are the same as the configurations and the arrangement in Embodiment 1. Accordingly, as with the liquid crystal display device 10 of Embodiment 1, the liquid crystal display device 10 of the present embodiment can suppress moiré and also suppress display inconsistencies caused by the light shields (the switching elements 240 and the light shields 280).

Embodiment 3

In the second liquid crystal display panel 200 of Embodiment 1, the two switching elements 240 are disposed across an intersection P1 of the scan wiring GL and the signal wiring DL. The switching elements 240 may be disposed at the intersections P1 of the scan wirings GL (the first light blocking pattern 260) and the signal wirings DL (the second light blocking pattern 270). Part of the plurality of light shields 280 may be formed from the contact portions 248a of the drain electrodes 248, and another part of the plurality of light shields 280 may be formed from the dummy light blocking layers DM.

As with the liquid crystal display device 10 of Embodiment 1, a liquid crystal display device 10 of the present embodiment includes a panel section 50, a backlight 300, and a display controller 400. The configurations of the first liquid crystal display panel 100, the first light blocking pattern 260 and the second light blocking pattern 270 (the scan wirings GL and the signal wirings DL) of the second liquid crystal display panel 200, the backlight 300, the display controller 400, and the like in the present embodiment are the same as the configurations thereof in Embodiment 1. Here, the second main pixels 202 and the light shields 280 of the second liquid crystal display panel 200 are described.

In the present embodiment as well, the second liquid crystal display panel 200 includes a second main pixel 202 arranged in a matrix. Furthermore, one second main pixel 202 of the second liquid crystal display panel 200 corresponds to 16 (4×4) first main pixels 102 of the first liquid crystal display panel 100.

Figure 17:
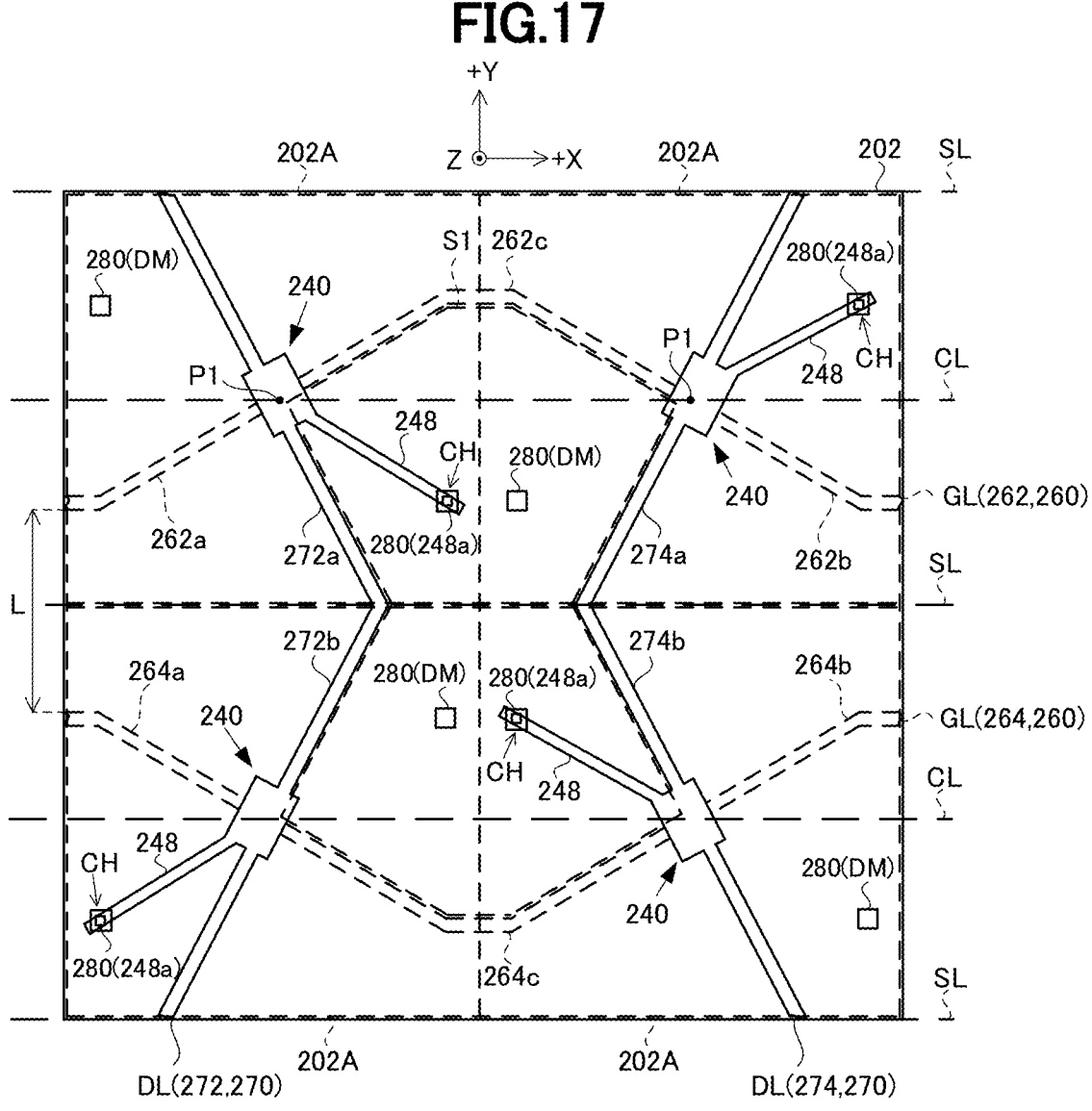
FIG. 17 is a schematic drawing illustrating scan wirings and signal wirings corresponding to one second main pixel, switching elements and contact holes of the second main pixel, and light shields according to Embodiment 3.
Figure 18:
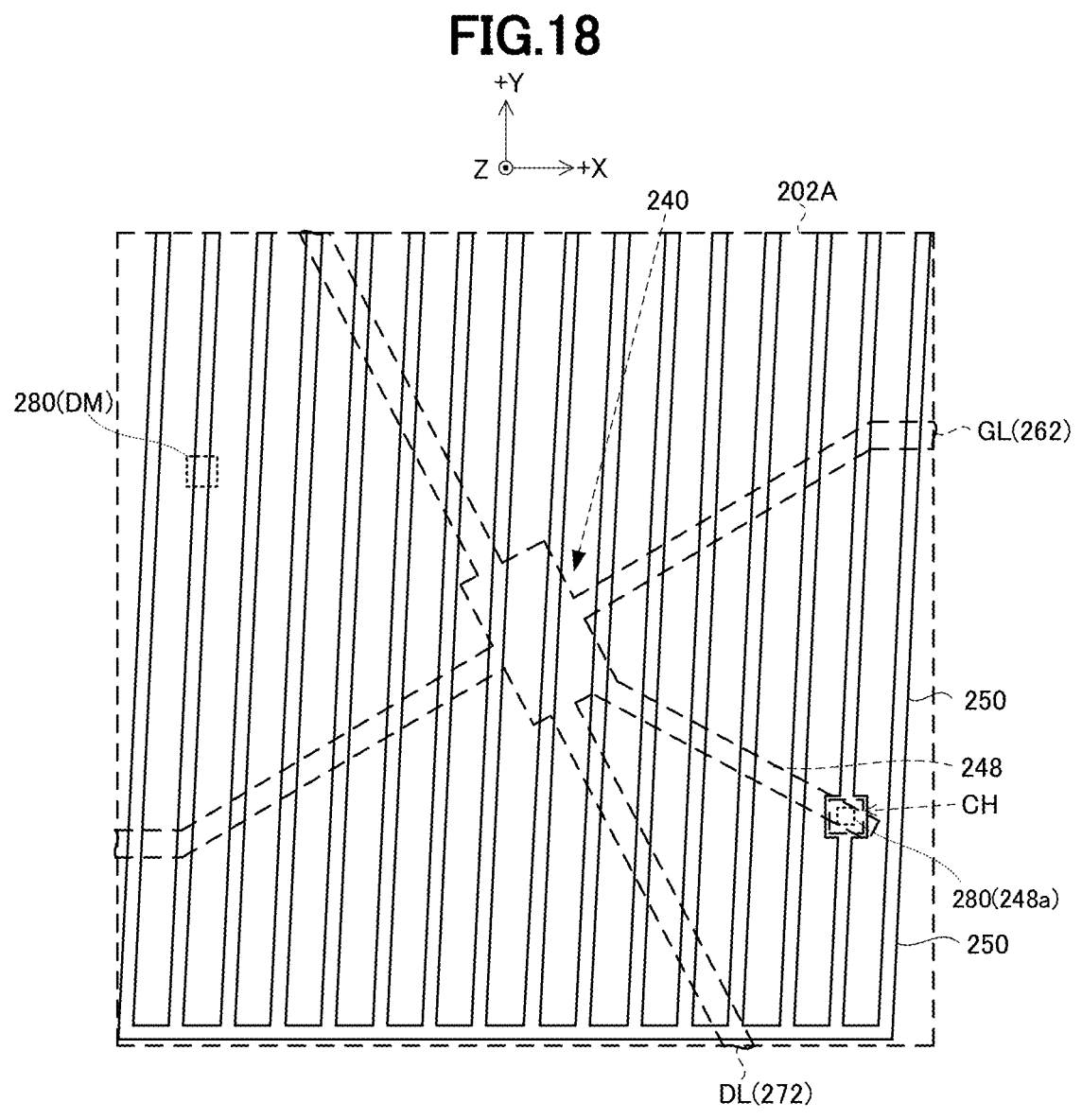

As illustrated in FIG. 17, the second main pixel 202 of the present embodiment has a rectangular shape and is divided into four regions 202A, in two rows and two columns, in the X direction and the Y direction. As illustrated in FIG. 18, one pixel electrode 250 is disposed in each region 202A. One pixel electrode 250 disposed in one region 202A connects to one switching element 240. As with Embodiment 1, one second main pixel 202 (four pixel electrodes 250) is driven by voltage (signals) from a pair of adjacent scan wirings GL and a pair of adjacent signal wirings DL.

As illustrated in FIG. 18, each pixel electrode 250 of the second main pixel 202 of the present embodiment has a comb-teeth shape. In the present embodiment, the one pixel electrode 250 is disposed in one region 202A. The one pixel electrode 250 is connected to one switching element 240 (a drain electrode 248) via a contact hole CH. In the present embodiment, as with the contact portion 248a connecting to one pixel electrode 250 via the contact hole CH2 of Embodiment 1, the contact portion 248a of the drain electrode 248 that connects to the one pixel electrode 250 via the contact hole CH forms a light shield 280.

As illustrated in FIG. 17, the switching elements 240 of the second main pixel 202 of the present embodiment are disposed at the intersections P1 of the scan wirings GL and the signal wirings DL. In the present embodiment as well, the switching elements 240 have light blocking properties.

Figure 19:
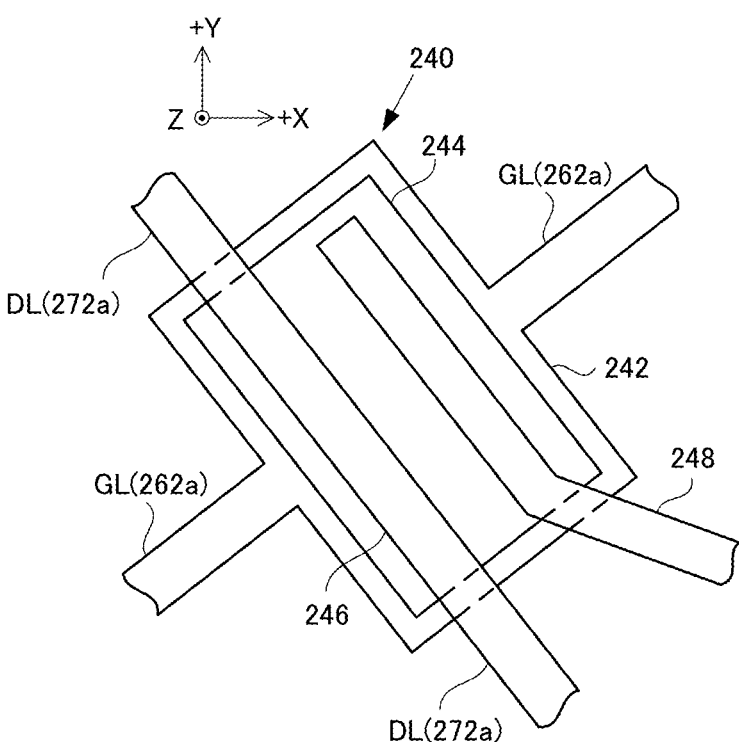
FIG. 19 is a plan view illustrating a switching element according to Embodiment 3.

In the present embodiment as well, as illustrated in FIG. 19, the gate electrode 242 of the switching element 240 is formed integrally with the scan wiring GL. Furthermore, the semiconductor layer 244 of the switching element 240 is provided, via the first insulating layer 292, in an island manner above the gate electrode 242. The source electrode 246 of the switching element 240 is formed integrally with the signal wiring DL. The drain electrode 248 of the switching element 240 is connected, via the contact hole CH, to the pixel electrode 250 at the contact portion 248a (FIG. 18). The configurations of the first insulating layer 292, the second insulating layer 294, and the like are the same as that in Embodiment 1. Additionally, the first insulating layer 292 is omitted from FIG. 19.

As with the light shields 280 of Embodiment 1, the light shields 280 of the present embodiment are located between the crossline CL and the symmetry axis SL of the first light blocking pattern 260 within the region S1, the crossline CL connecting the intersections P1 of the first light blocking pattern 260 and the second light blocking pattern 270 and extending in the X direction, the region S1 being a region that is surrounded by the first light blocking pattern 260 (the first light blocking line 262 and the second light blocking line 264) and the second light blocking pattern 270 (the third light blocking line 272 and the fourth light blocking line 274) and in which a spacing L between the first light blocking line 262 and the second light blocking line 264 is continuously widen from the both ends of the region S1 in the X direction (FIG. 17). Furthermore, two light shields 280 are aligned in the X direction between the crossline CL and the symmetry axis SL in the region S1, and four light shields 280 are located within the region S1. The four light shields 280 are located line-symmetrically with respect to the X direction and the Y direction. In the present embodiment, one light shield 280 of the two light shields 280 aligned in the X direction is formed from the contact portion 248a of the drain electrode 248 that connects to the one pixel electrode 250 via the contact hole CH. The other light shield 280 of the two light shields 280 aligned in the X direction is formed from the dummy light blocking layer DM, as with the light shields 280 of Embodiment 2.

The configurations of the first light blocking pattern 260 and the second light blocking pattern 270 (the scan wirings GL and the signal wirings DL) of the present embodiment are the same as the configurations of the first light blocking pattern 260 and the second light blocking pattern 270 in Embodiment 1. As such, the liquid crystal display device 10 of the present embodiment can also suppress color moiré. In the present embodiment, the switching elements 240 are disposed at the intersections P1 of the scan wirings GL and the signal wirings DL and the light shields 280 are located between the crossline CL and the symmetry axis SL in the region S1. As such, the spacings between the dark areas formed due to the light shields (the switching elements 240 and the light shields 280) are narrowed. Therefore, the liquid crystal display device 10 of the present embodiment can also suppress the display inconsistencies by the dark areas. As above, as with the liquid crystal display device 10 of Embodiment 1, the liquid crystal display device 10 of the present embodiment can suppress moiré and also suppress display inconsistencies caused by the light shields (the switching elements 240 and the light shields 280).

Embodiment 4

In Embodiment 3, the switching elements 240 are disposed at the intersections P1 of the scan wirings GL and the signal wirings DL, and part of the plurality of light shields 280 is formed from the contact portions 248a of the drain electrodes 248. The switching elements 240 may be disposed at the intersections P1 of the scan wirings GL and the signal wirings DL and all of the plurality of light shields 280 may be formed from the dummy light blocking layer DM.

Here, the contact holes CH of the second main pixel 202 and the light shields 280 are described. The other configurations of the liquid crystal display device 10 of the present embodiment are the same as the configurations of Embodiment 3.

Figure 20:
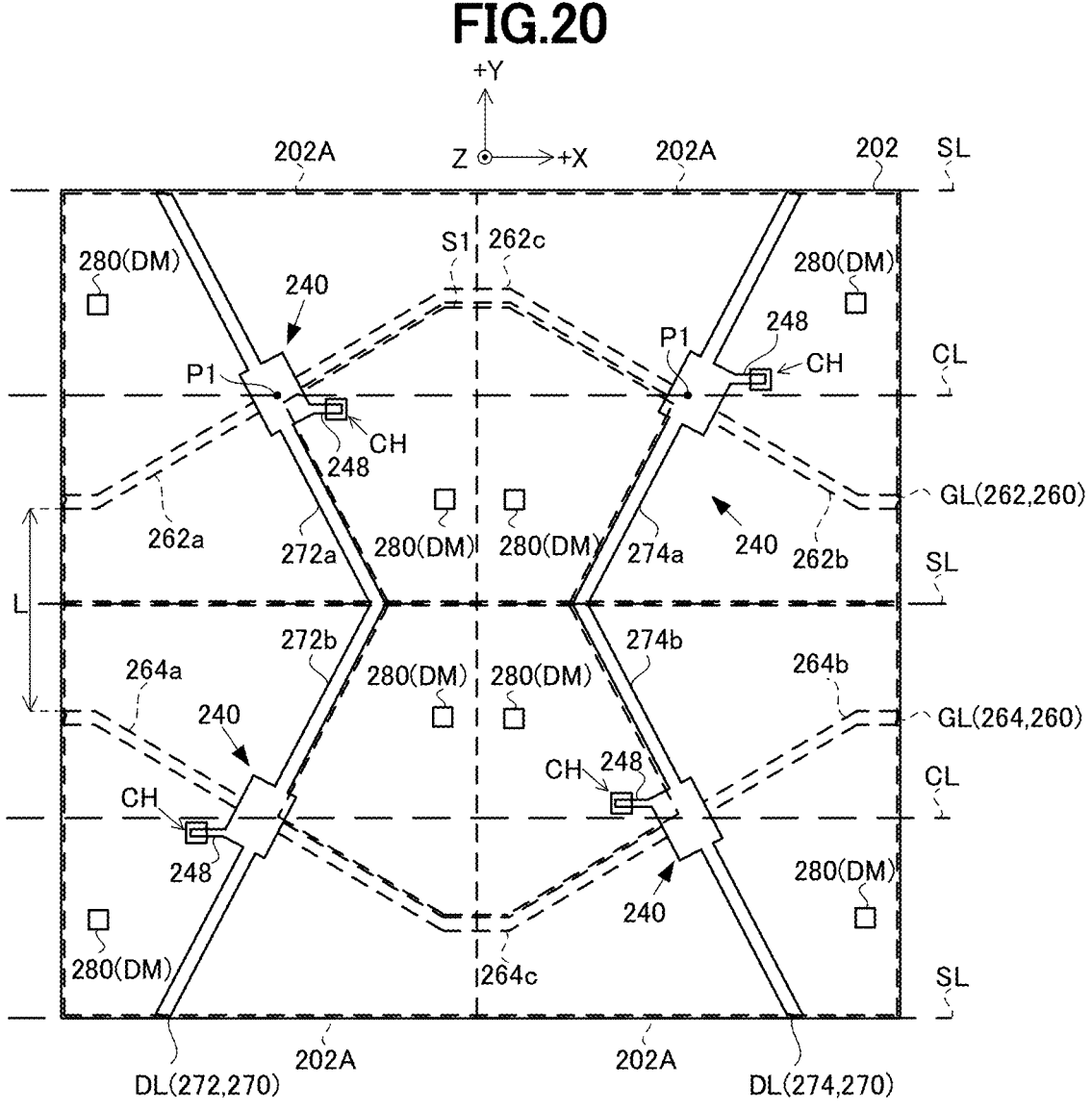
FIG. 20 is a schematic drawing illustrating scan wirings and signal wirings corresponding to one second main pixel, switching elements and contact holes of the second main pixel, and light shields according to Embodiment 4.
Figure 21:
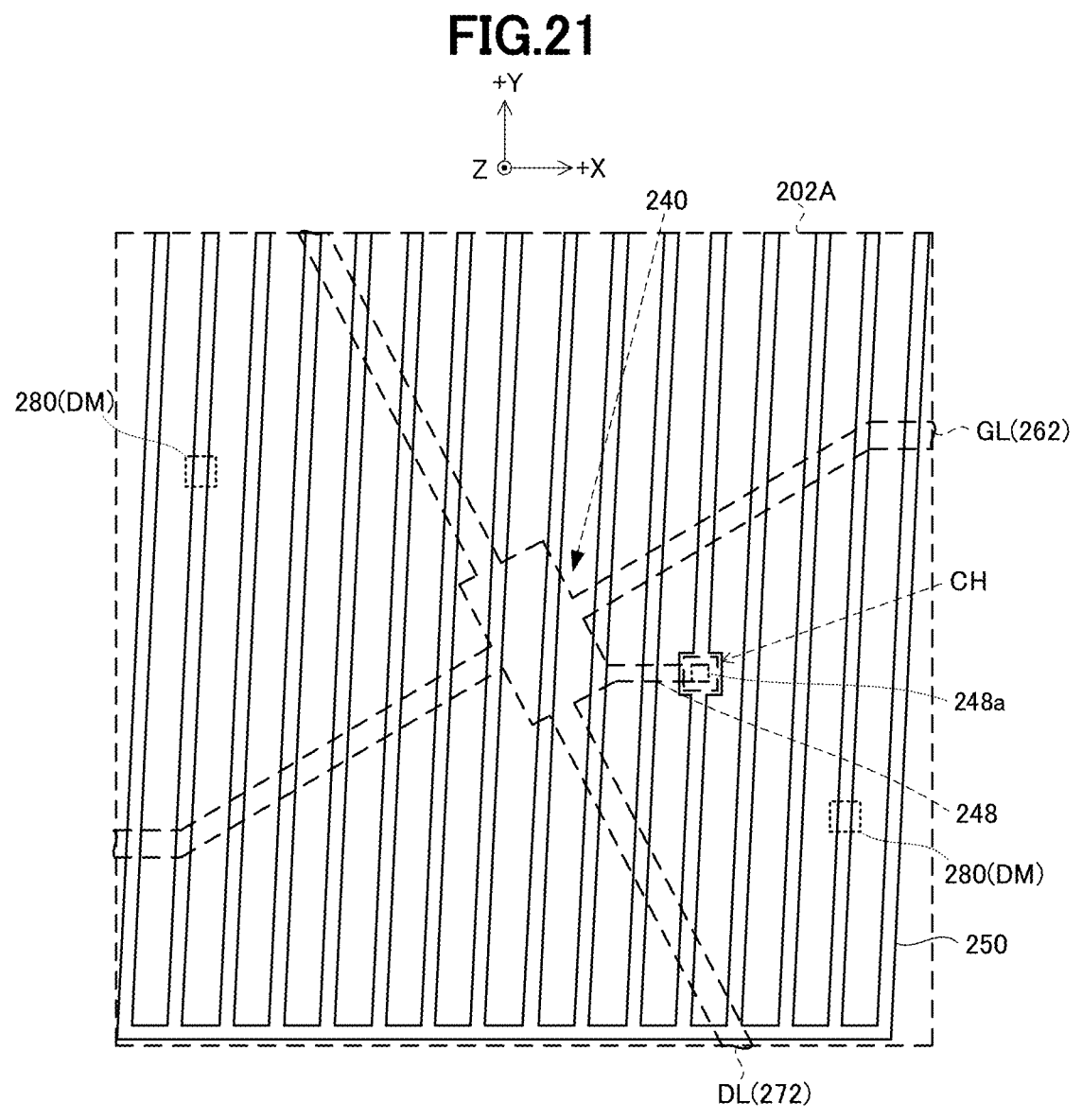

The contact holes CH of the present embodiment are provided in the proximity of the switching elements 240 as illustrated in FIGS. 20 and 21. Furthermore, when the first liquid crystal display panel 100 overlaps the second liquid crystal display panel 200, the contact holes of the present embodiment overlap the black matrix BM of the first liquid crystal display panel 100. The switching element 240 (the contact portion 248a of the drain electrode 248) of the present embodiment is connected, via the contact hole CH, to the pixel electrode 250. In the present embodiment, the contact hole CH overlaps the black matrix BM of the first liquid crystal display panel 100. As such, the contact portion 248a of the drain electrode 248 does not substantially function as a light shield that blocks light that is incident on the subpixels 104 (first main pixel 102) of the first liquid crystal display panel 100.

All of the light shields 280 of the present embodiment are formed from the dummy light blocking layers DM. The configuration of the dummy light blocking layer DM of the present embodiment is the same as that of the dummy light blocking layer in Embodiment 2.

As with Embodiments 1 to 3, the light shields 280 of the present embodiment are located between a crossline CL and a symmetry axis SL of the first light blocking pattern 260 within a region S1, the crossline CL connecting the intersections P1 of the first light blocking pattern 260 and the second light blocking pattern 270 and extending in the X direction, the region S1 being a region that is surrounded by the first light blocking pattern 260 (the first light blocking line 262 and the second light blocking line 264) and the second light blocking pattern 270 (the third light blocking line 272 and the fourth light blocking line 274) and in which a spacing L between the first light blocking line 262 and the second light blocking line 264 is continuously widen from the both ends of the region S1 in the X direction (FIG. 20). Furthermore, two light shields 280 are aligned in the X direction between the crossline CL and the symmetry axis SL in the region S1, and four light shields 280 are located within the region S1. The four light shields 280 are located line-symmetrically with respect to the X direction and the Y direction.

The configurations of the first light blocking pattern 260 and the second light blocking pattern 270 (the scan wirings GL and the signal wirings DL) and the arrangement of the switching elements 240 and the light shields 280 in the present embodiment are the same as the configurations and the arrangement in Embodiment 3. Accordingly, as with the liquid crystal display device 10 of Embodiment 3, the liquid crystal display device 10 of the present embodiment can suppress moiré and also suppress display inconsistencies caused by the light shields (the switching elements 240 and the light shields 280).

Embodiment 5

In Embodiment 3, the switching elements 240 are disposed at the intersections P1 of the scan wirings GL and the signal wirings DL, and part of the plurality of light shields 280 is formed from the contact holes CH. The switching elements 240 may be disposed at the intersections P1 of the scan wirings GL and the signal wirings DL, and all of the plurality of light shields 280 may be formed from the contact portions 248a of the drain electrodes 248.

As with the liquid crystal display device 10 of Embodiments 1 to 4, a liquid crystal display device 10 of the present embodiment includes a panel section 50, a backlight 300, and a display controller 400. The configurations of the first liquid crystal display panel 100, the first light blocking pattern 260 and the second light blocking pattern 270 (the scan wirings GL and the signal wirings DL) of the second liquid crystal display panel 200, the backlight 300, the display controller 400, and the like in the present embodiment are the same as the configurations thereof in Embodiments 1 to 4. Here, the second main pixels 202 of the second liquid crystal display panel 200 and the light shields 280 are described.

In the present embodiment as well, the second liquid crystal display panel 200 includes a second main pixel 202 arranged in a matrix. Furthermore, one second main pixel 202 of the second liquid crystal display panel 200 corresponds to 16 (4×4) first main pixels 102 of the first liquid crystal display panel 100.

Figure 22:
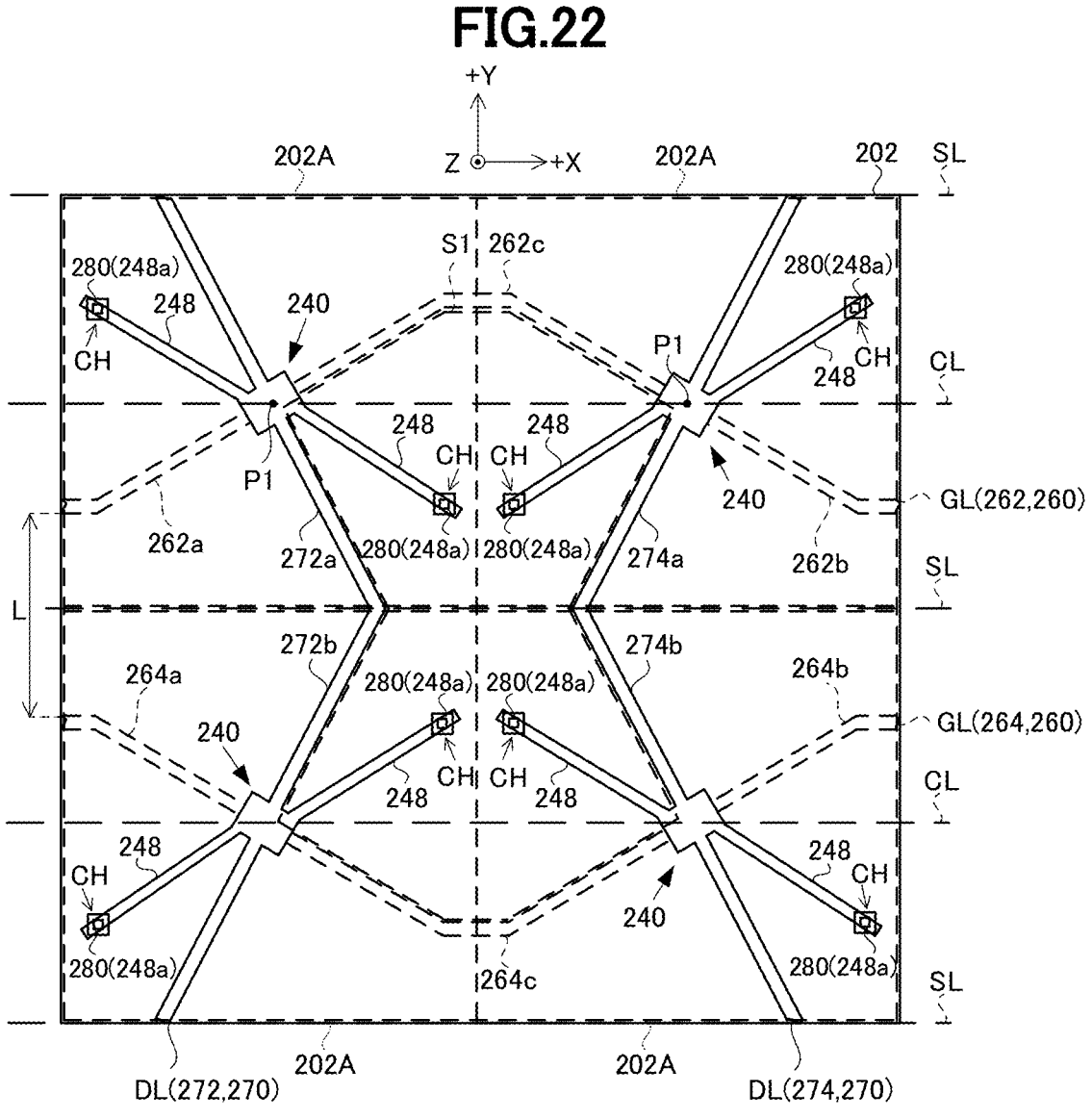
FIG. 22 is a schematic drawing illustrating scan wirings and signal wirings corresponding to one second main pixel, switching elements and contact holes of the second main pixel, and light shields according to Embodiment 5.
Figure 23:
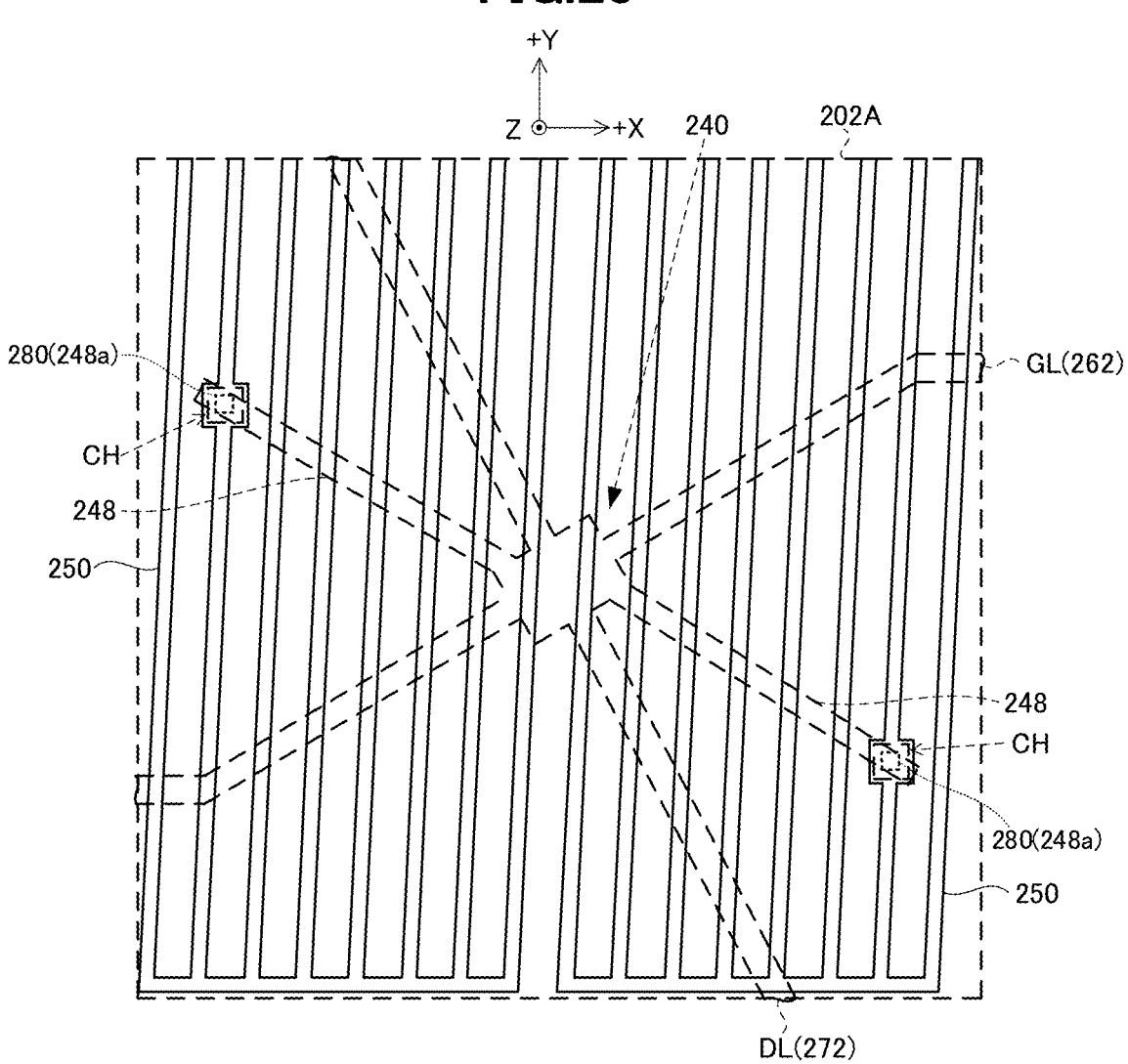
FIG. 23 is a plan view illustrating a region of the second main pixel according to Embodiment 5.

As illustrated in FIG. 22, the second main pixel 202 of the present embodiment has a rectangular shape and is divided into four regions 202A, in two rows and two columns, in the X direction and the Y direction. In the present embodiment, as illustrated in FIG. 23, two pixel electrodes 250 are disposed in each region 202A. The two pixel electrodes 250 disposed in one region 202A are connected to one switching element 240. As with Embodiment 1, one second main pixel 202 (eight pixel electrodes 250) is driven by voltage (signals) from a pair of adjacent scan wirings GL and a pair of adjacent signal wirings DL.

As illustrated in FIG. 23, each pixel electrode 250 of the second main pixel 202 of the present embodiment has a comb-teeth shape. In the present embodiment, two pixel electrodes 250 are disposed in one region 202A. In the present embodiment, the two pixel electrodes 250 are connected to one switching element 240. The pixel electrodes 250 connect, via the contact holes CH, to the switching elements 240 (the contact portions 248a of the drain electrodes 248). In the present embodiment, as with Embodiment 3, the contact portion 248a of the drain electrode 248 that connects to the pixel electrodes 250 via the contact hole CH forms a light shield 280.

As with the switching elements 240 in Embodiment 4, the switching elements 240 of the second main pixel 202 of the present embodiment are disposed at the intersections P1 of the scan wirings GL and the signal wirings DL (FIG. 22). The switching elements 240 of the present embodiment also have light blocking properties.

Figure 24:
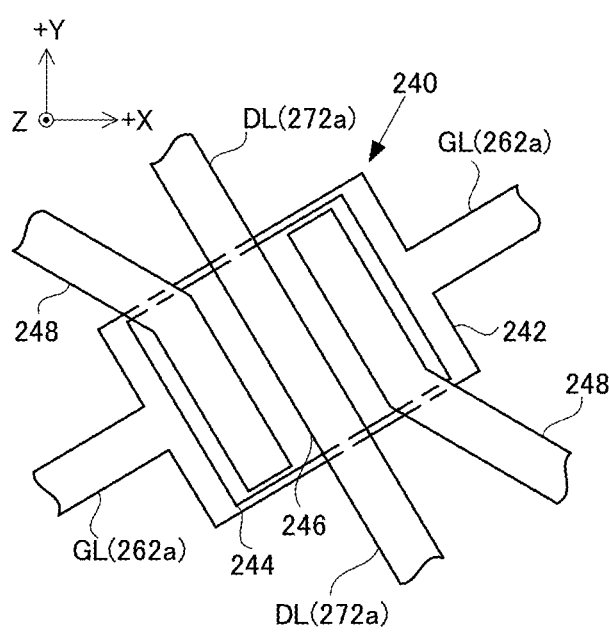
FIG. 24 is a plan view illustrating a switching element according to Embodiment 5.

In the present embodiment as well, as illustrated in FIG. 24, the gate electrode 242 of the switching element 240 is formed integrally with the scan wiring GL. Furthermore, the semiconductor layer 244 of the switching element 240 is provided, via the first insulating layer 292, in an island manner above the gate electrode 242. The source electrode 246 of the switching element 240 is formed integrally with the signal wiring DL. The drain electrode 248 of the switching element 240 is connected, via the contact hole CH, to the pixel electrode 250 at the contact portion 248a. In the present embodiment, the two drain electrodes 248 are provided with the source electrode 246 therebetween, and each of the drain electrodes 248 is connected to the corresponding pixel electrode 250 at the corresponding contact portion 248a (FIG. 23). The configurations of the first insulating layer 292, the second insulating layer 294, and the like are the same as that in Embodiment 1. Additionally, the first insulating layer 292 is omitted from FIG. 24.

In the present embodiment, the source electrode 246 is provided between the two drain electrodes 248 and, as such, the size of the switching elements 240 can be reduced.

All of the light shields 280 of the present embodiment are formed from the contact portions 248a of the drain electrodes 248 that connect to the pixel electrodes 250 via the contact holes CH. The light shields 280 of the present embodiment are arranged as with the light shields 280 in Embodiments 1 to 4 (FIG. 22).

The configurations of the first light blocking pattern 260 and the second light blocking pattern 270 (the scan wirings GL and the signal wirings DL) in the present embodiment are the same as the configurations of the first light blocking pattern 260 and the second light blocking pattern 270 in Embodiments 1 to 4. The arrangement of the switching elements 240 and the light shields 280 in the present embodiment is the same as the arrangement of the switching elements 240 and the light shields 280 in Embodiment 4. Accordingly, the liquid crystal display device 10 of the present embodiment can also suppress moiré and suppress display inconsistencies caused by the light shields (the switching elements 240 and the light shields 280).

Furthermore, one switching element 240 is connected to two pixel electrodes 250. Therefore, even if a defect occurs in a pixel electrode 250, the defective area within the second main pixel 202 can be minimized and the yield of manufacturing the second liquid crystal display panel 200 can be improved. Furthermore, the source electrode 246 is provided between the two drain electrodes 248 and, as such, the size of the switching elements 240 can be reduced.

Modified Examples

While the embodiments have been described above, various modifications can be made to the present disclosure without departing from the scope thereof.

For example, in the embodiments, the first liquid crystal display panel 100 and the second liquid crystal display panel 200 operate by the horizontal electric field type method. However, the operating method of the first liquid crystal display panel 100 and the second liquid crystal display panel 200 may be determined as desired.

In the embodiments, the first liquid crystal display panel 100 is positioned on an observer side (the +Z side), and the second liquid crystal display panel 200 is positioned on a side opposite the surface on the observer side of the first liquid crystal display panel 100. The second liquid crystal display panel 200 may be positioned on an observer side, and the first liquid crystal display panel 100 may be positioned on a side opposite the surface on the observer side of the second liquid crystal display panel 200.

In the embodiments, the first polarizing plate 132 of the first liquid crystal display panel 100 also serves as a polarizing plate on the light emission side of the second liquid crystal display panel 200. However, a configuration is possible in which the second liquid crystal display panel 200 includes a polarizing plate on the main surface 220b of the second counter substrate 220.

In the embodiments, the stripe direction of the color filter 122 of the first liquid crystal display panel 100 is the Y direction. A configuration is possible in which the stripe direction of the color filter 122 of the first liquid crystal display panel 100 is the X direction.

In the embodiments, the second liquid crystal display panel 200 is not provided with a color filter and a black matrix, but the second liquid crystal display panel 200 may be provided with a color filter and a black matrix.

In the embodiments, the first liquid crystal display panel 100 includes a first liquid crystal 130 that is implemented as a positive nematic liquid crystal. The second liquid crystal display panel 200 includes a second liquid crystal 230 that is implemented as a positive nematic liquid crystal. The first liquid crystal 130 may be implemented as a negative nematic liquid crystal. The second liquid crystal 230 may be implemented as a negative nematic liquid crystal.

In the embodiments, the first light blocking line 262 of the first light blocking pattern 260 includes the first flat section 262c, and the second light blocking line 264 of the first light blocking pattern 260 includes the second flat section 264c. However, a configuration is possible in which the first light blocking line 262 does not include the first flat section 262c, and the second light blocking line 264 does not include the second flat section 264c. That is, a configuration is possible in which the first light blocking line 262 and the second light blocking line 264 have a line-symmetrical relationship with respect to the X direction, and each extend in a zig-zag in the X direction.

Meanwhile, a configuration is possible in which the third light blocking line 272 of the second light blocking pattern 270 includes a third flat section that connects the fifth incline 272a and the sixth incline 272b to each other, and extends parallel to the Y direction. Additionally, a configuration is possible in which the fourth light blocking line 274 of the second light blocking pattern 270 includes a fourth flat section that connects the seventh incline 274a and the eighth incline 274b to each other, and extends parallel to the Y direction.

Furthermore, the second light blocking pattern 270 (the third light blocking line 272 and the fourth light blocking line 274) may be in a linear fashion.

In the embodiments, the scan wirings GL form the first light blocking line 262 and the second light blocking line 264 of the first light blocking pattern 260. It is sufficient that at least one of the first light blocking line 262 or the second light blocking line 264 of the first light blocking pattern 260 is formed from a scan wiring GL. For example, a configuration is possible in which, in a case where the first light blocking line 262 is formed from a scan wiring GL, the second light blocking line 264 is a low-resistance wiring that connects the common electrodes CE. A configuration is possible in which the second light blocking line 264 is a light shield (light blocking pattern) formed from an organic material having light blocking properties.

The second light blocking pattern 270 needs not be formed from a signal wiring DL. For example, a configuration is possible in which the second light blocking pattern 270 is a light shield formed from an organic material having light blocking properties. Furthermore, a configuration is possible in which one of the third light blocking line 272 and the fourth light blocking line 274 of the second light blocking pattern 270 is formed from a signal wiring DL, and the other is formed from an organic material having light blocking properties.

Figure 25:
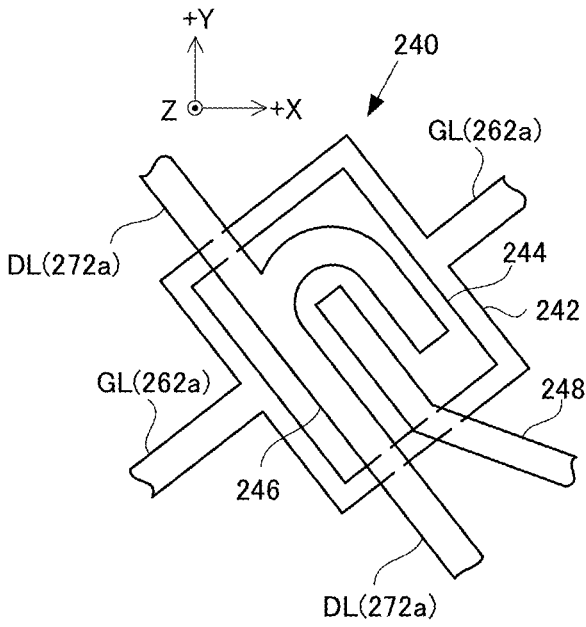
FIG. 25 is a plan view illustrating a switching element according to a modified example.

In the embodiments, the source electrode 246 of the switching elements 240 is in a linear fashion, but the source electrode 246 may have a U-shape. For example, as illustrated in FIG. 25, each switching element 240 in Embodiment 3 may include a U-shaped source electrode 246. As such, the size of the switching element 240 can be reduced. The first insulating layer 292 is omitted from FIG. 25.

In the embodiments, one second main pixel 202 of the second liquid crystal display panel 200 corresponds to 16 first main pixels 102 of the first liquid crystal display panel 100. However, the number of first main pixels 102 of the first liquid crystal display panel 100 that one second main pixel 202 of the second liquid crystal display panel 200 corresponds to may be set as desired.

Figure 26:
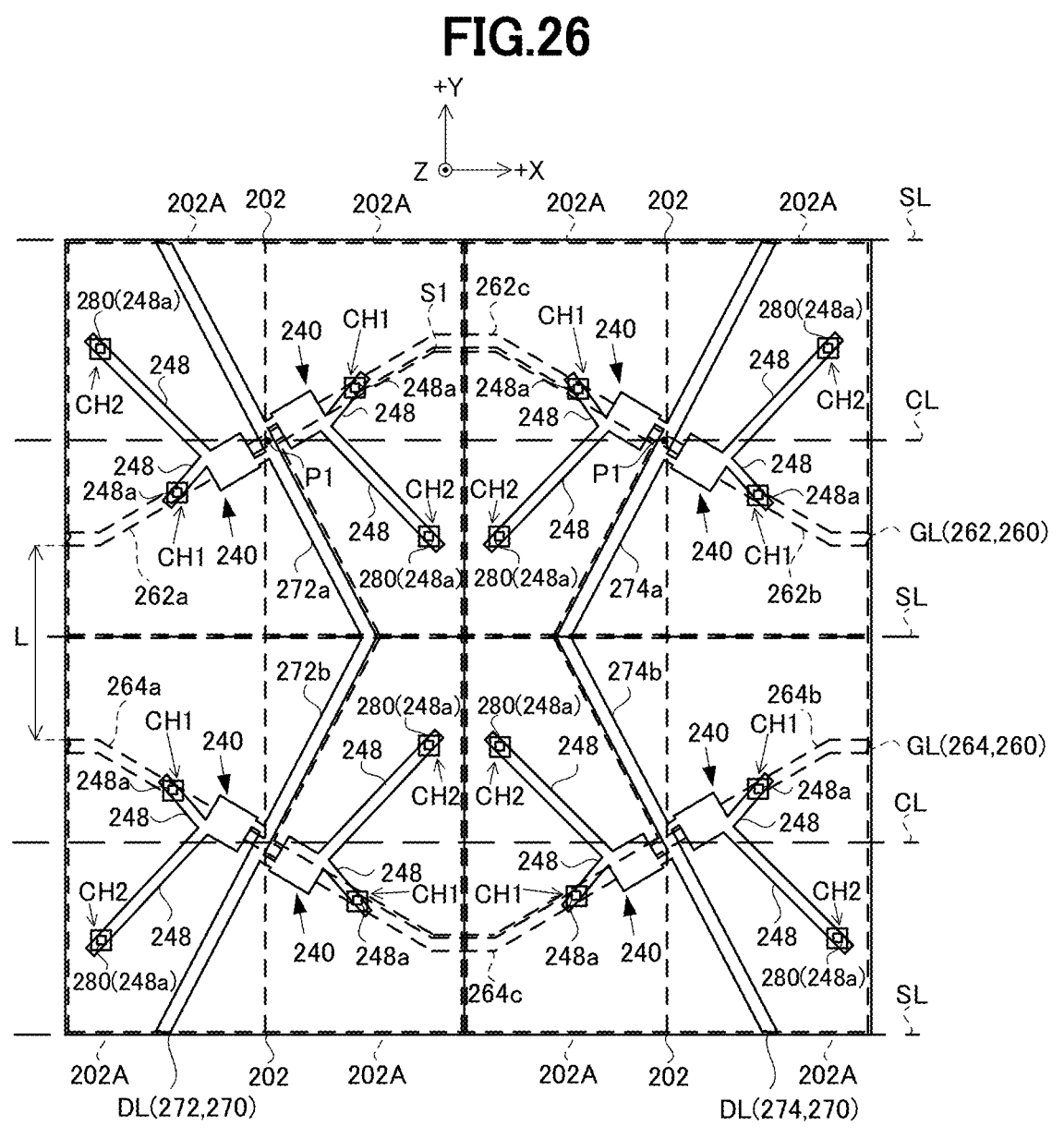

In the embodiments, identical gate signals (gate signals at the same timing) from a pair of adjacent scan wirings GL and identical data signals from a pair of adjacent signal wirings DL are input to the switching elements 240 and, as such one second main pixel 202 of the second liquid crystal display panel 200 is driven. The pair of adjacent scan wirings GL may supply gate signals to the switching elements 240 at different timings and may supply different data signals to the switching elements 240. In this case, the configuration of one second main pixel 202 of Embodiment 1 (FIG. 6) corresponds a configuration of four (2×2) second main pixels 202 in the modified example (FIG. 26).

The contact holes CH, CH1, CH2 may be formed across a plurality of comb-like teeth portions of a pixel electrode 250.

The contact portions 248a of the drain electrodes 248 that form the light shields 280 are positioned on the bottom of the contact holes CH, CH1, CH2. Therefore, it can be said that the contact holes CH2 of Embodiment 1 and the contact holes CH of Embodiments 3 and 5 function as light shields that shield light.

In Embodiment 1, the contact hole CH1 and the contact portion 248a of the drain electrode 248 that connects to the pixel electrode 250 via the contact hole CH1 are formed above the scan wiring GL (FIG. 9). Meanwhile, no scan wiring GL is formed below the contact hole CH2 and the contact portion 248a of the drain electrode 248 that connects to the pixel electrode 250 via the contact hole CH2 (FIG. 10). A light shield may be formed, using the same material as that of the scan wiring GL, below the contact hole CH2 and the contact portion 248a of the drain electrode 248 that connects to the pixel electrode 250 via the contact hole CH2. By forming this light shield, the cross-sectional structure of contact hole CH1 and the cross-sectional structure of contact hole CH2 are to be the same. As such variation in shapes of the contact hole CH1 and the contact hole CH2 and poor connection between the pixel electrode 250 and the drain electrode 248 can be suppressed.

The wiring width of the drain electrode 248 between the contact portion 248a (the light shield 280) that connects to the pixel electrode 250 via the contact hole CH, CH2, and the switching element 240 is preferably narrower than the wiring width of the signal wiring DL and the wiring width of the scan wiring GL. Accordingly, the light blocking effect achievable by the drain electrode 248 between the contact portion 248a and the switching element 240 is less than the light blocking effect achievable by the contact portion 248a (the light shield 280). However, the entire drain electrode 248 may be functioned as a light shield by adjusting the wiring width of the drain electrode 248 between the contact portion 248a and the switching element 240.

In the embodiments, the dummy light blocking layer DM (the light shield 280) is formed above the main surface 210a of the second TFT substrate 210. However, the position at which the dummy light blocking layer DM is formed may be determined as desired. For example, a configuration is possible in which the dummy light blocking layer DM is formed above the first insulating layer 292. Furthermore, a configuration is possible in which the dummy light blocking layer DM is provided to the second counter substrate 220.

Figure 27:
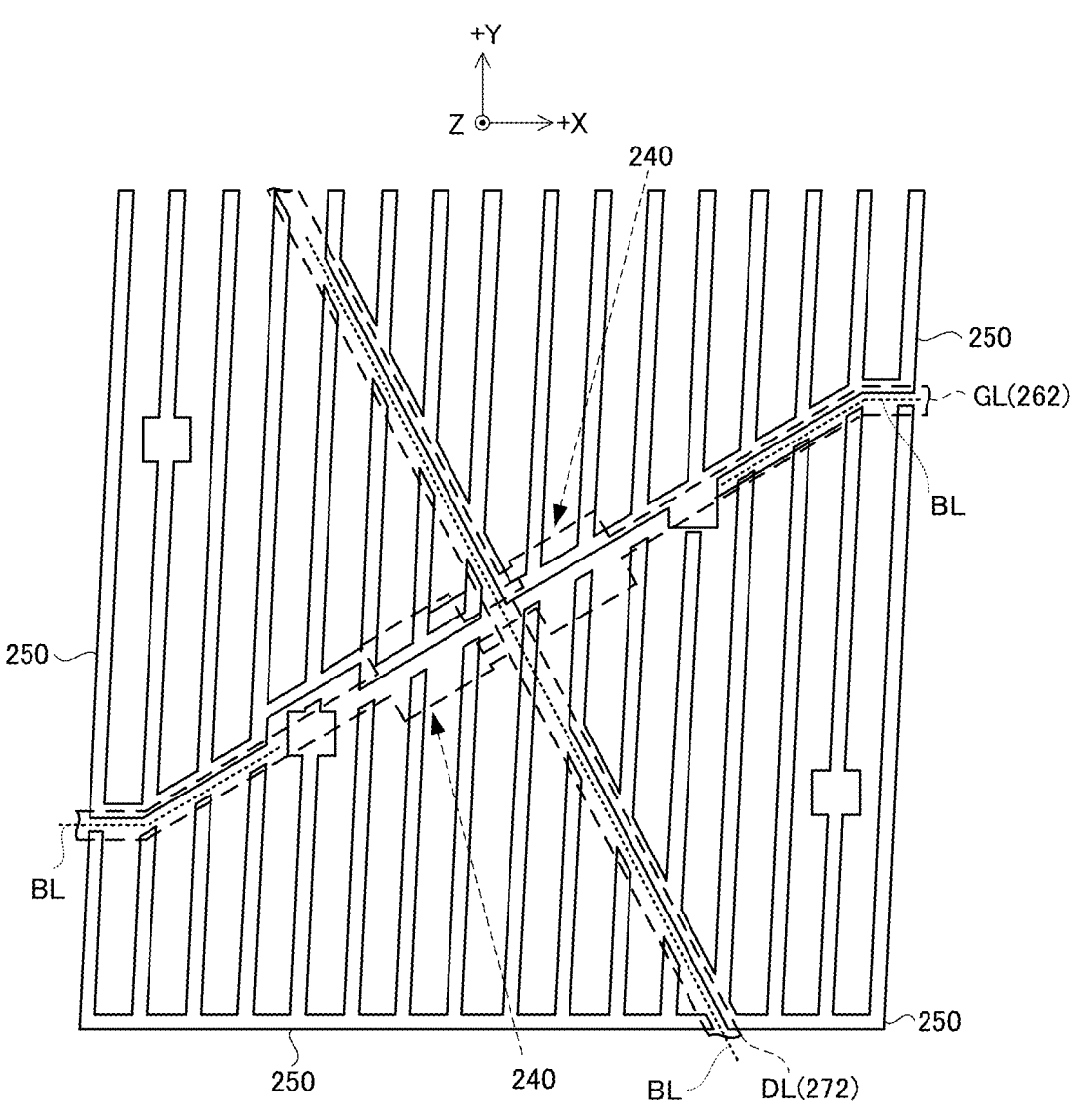
FIG. 27 is a plan view illustrating pixel electrodes according to a modified example.

It is preferable that a portion of the boundary BL of the two adjacent pixel electrodes 250 is along the scan wiring GL (the first light blocking pattern 260) or the signal wiring DL (the second light blocking pattern 270). For example, as illustrated in FIG. 27, the portions of the boundaries BL of the pixel electrodes 250 in Embodiment 1 may overlap the scan wiring GL or the signal wiring DL. Note that, to facilitate comprehension, the drain electrode 248, the contact holes CH1, CH2, and the like are omitted from FIG. 27.

The switching elements 240 of the second main pixel 202 may be disposed along the scan wirings GL (the first light blocking line 262 and the second light blocking line 264). In the embodiments, the switching element 240 is inclined with respect to the X direction, but the switching element 240 may be formed along the X direction.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A liquid crystal display device, comprising:

a first liquid crystal display panel that displays a color display element and in which a first main pixel including a plurality of subpixels of different colors is disposed; and a second liquid crystal display panel that overlaps with the first liquid crystal display panel and displays a monochrome display element and in which a second main pixel corresponding to a plurality of the first main pixels is disposed, wherein the second liquid crystal display panel includes a switching element that drives the second main pixel and has light blocking properties, a first light blocking pattern that extends in a first direction that is predetermined, is arranged repeatedly, and has light blocking properties, a second light blocking pattern that extends in a second direction that is predetermined and perpendicular to the first direction, is arranged repeatedly, and has light blocking properties, and a plurality of light shields that have light blocking properties, the first light blocking pattern includes a first light blocking line that extends in the first direction and includes a first incline inclined with respect to the first direction and a second incline inclined in a direction opposite the first incline with respect to the first direction, and a second light blocking line that is adjacent to the first light blocking line and is line-symmetrical, with respect to the first direction, to the first light blocking line, the plurality of light shields are each located between a crossline and a symmetry axis of the first light blocking pattern within a region, the crossline connecting intersections of the first light blocking pattern and the second light blocking pattern and extending in the first direction, the region being a region that is surrounded by the first light blocking pattern and the second light blocking pattern and in which a spacing between the first light blocking line and the second light blocking line is continuously widened from both ends of the region in the first direction, and at least one of the first light blocking line or the second light blocking line is formed from a scan wiring of the second liquid crystal display panel.

2. The liquid crystal display device according to claim 1, wherein the second light blocking pattern includes a third light blocking line extending in the second direction and a fourth light blocking line extending in the second direction and being adjacent to the third light blocking line, and at least one of the third light blocking line or the fourth light blocking line is formed from a signal wiring of the second liquid crystal display panel.

3. The liquid crystal display device according to claim 1, wherein at least a part of the plurality of light shields is formed from a contact portion, of a drain electrode of the switching element, that connects to a pixel electrode of the second main pixel.

4. The liquid crystal display device according to claim 3, wherein the second main pixel has a plurality of pixel electrodes, and the switching element connects to the pixel electrodes.

5. The liquid crystal display device according to claim 1, wherein the second main pixel has a plurality of pixel electrodes, and at least a portion of a boundary of the plurality of pixel electrodes is along the first light blocking pattern or the second light blocking pattern.

6. The liquid crystal display device according to claim 1, wherein the plurality of light shields are arranged in twos between the crossline and the symmetry axis of the first light blocking pattern.

7. The liquid crystal display device according to claim 1, wherein the first light blocking line includes a first flat section that connects the first incline and the second incline to each other and extends parallel to the first direction, and the second light blocking line includes a third incline opposing the first incline, a fourth incline opposing the second incline, and a second flat section that connects the third incline and the fourth incline to each other and extends parallel to the first direction.

8. The liquid crystal display device according to claim 7, wherein when viewed in plan, a center of the light shield is located one subpixel away in the second direction from a center line extending in the first direction, of the first flat section or the second flat section.

9. The liquid crystal display device according to claim 7, wherein the plurality of light shields are arranged in twos between the crossline and the symmetry axis of the first light blocking pattern, and when viewed in plan, each of the plurality of light shields is located on a straight line that connects one end of the first flat section with one end of the second flat section and extends in the second direction or on a straight line that connects another end of the first flat section with another end of the second flat section and extends in the second direction.

10. The liquid crystal display device according to claim 6, wherein a space between centers of the plurality of light shields arranged in twos in the first direction corresponds to one subpixel.

11. The liquid crystal display device according to claim 9, wherein a space between centers of the plurality of light shields arranged in twos in the first direction corresponds to one subpixel.

* * * * *